United States Patent [19]

Kobayashi

[11] Patent Number: 5,450,141
[45] Date of Patent: Sep. 12, 1995

[54] LENS COUPLING STRUCTURE FOR RIMLESS EYEGLASSES

[75] Inventor: Mitsuo Kobayashi, Fukui, Japan

[73] Assignees: Optica Fukui, Inc.; Eye-Protor Kobayashi Inc., both of Fukui, Japan

[21] Appl. No.: 264,528

[22] Filed: Jun. 23, 1994

[30] Foreign Application Priority Data

Feb. 7, 1994 [JP] Japan .................. 6-035498

[51] Int. Cl.⁶ .............................. G02C 1/02
[52] U.S. Cl. ...................... 351/110; 351/96; 351/141; 411/136
[58] Field of Search .................. 351/110, 86, 96, 108, 351/109, 140, 141, 149; 2/443; 411/132, 136, 147, 160, 162, 531, 542

[56] References Cited

U.S. PATENT DOCUMENTS

| | | | |
|---|---|---|---|
| 732,817 | 5/1902 | Bahle | 411/147 |
| 1,877,089 | 6/1930 | Uhlemann | 351/149 |
| 2,004,005 | 3/1934 | McDonal | 351/110 |
| 2,301,287 | 7/1939 | Kirk et al. | 351/146 |
| 4,502,765 | 3/1985 | Cooper | 351/110 |

*Primary Examiner*—William L. Sikes
*Assistant Examiner*—Huy Mai
*Attorney, Agent, or Firm*—Wenderoth, Lind & Ponack

[57] ABSTRACT

A lens coupling structure couples a bridge or a temple to a lens of rimless eyeglasses. A bridge or a temple is coupled through a flanged bush to the lens which is formed with a screw hole and a recess. The coupling portion of the bridge or temple and the flanged bush are formed with a screw hole. A fixing screw extends through the bridge or temple, the flanged bush and the lens. The flanged bush has a flange and a cylindrical portion received in the hole formed in the lens. The corresponding portion of the bridge or temple has a protrusion adapted to be received in a recess formed in the flanged bush. The protrusion may be provided on the fixing screw or a seating plate mounted between the flanged bush and the bridge or temple.

39 Claims, 22 Drawing Sheets

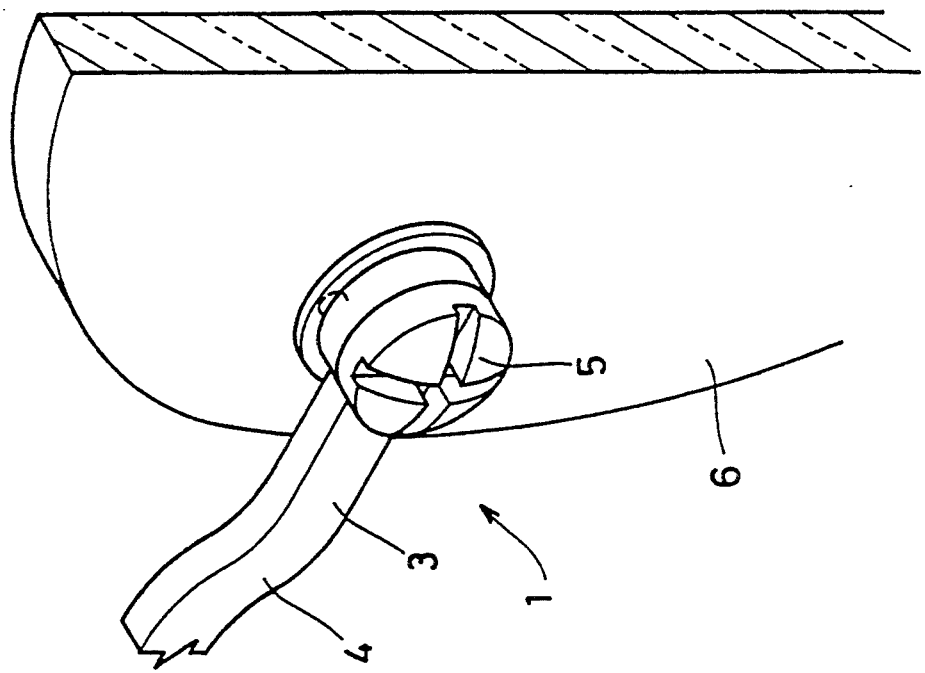
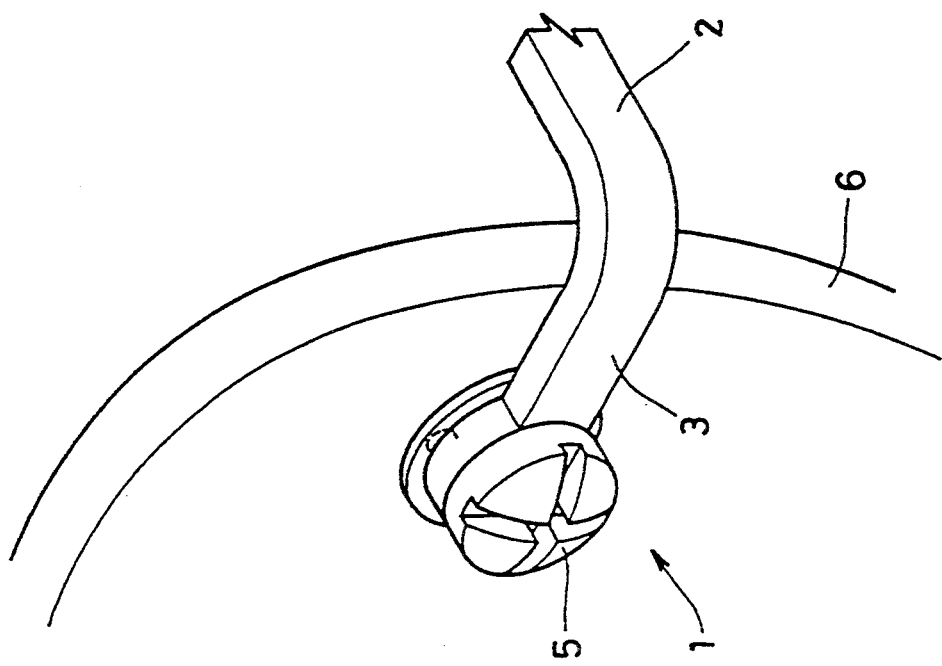

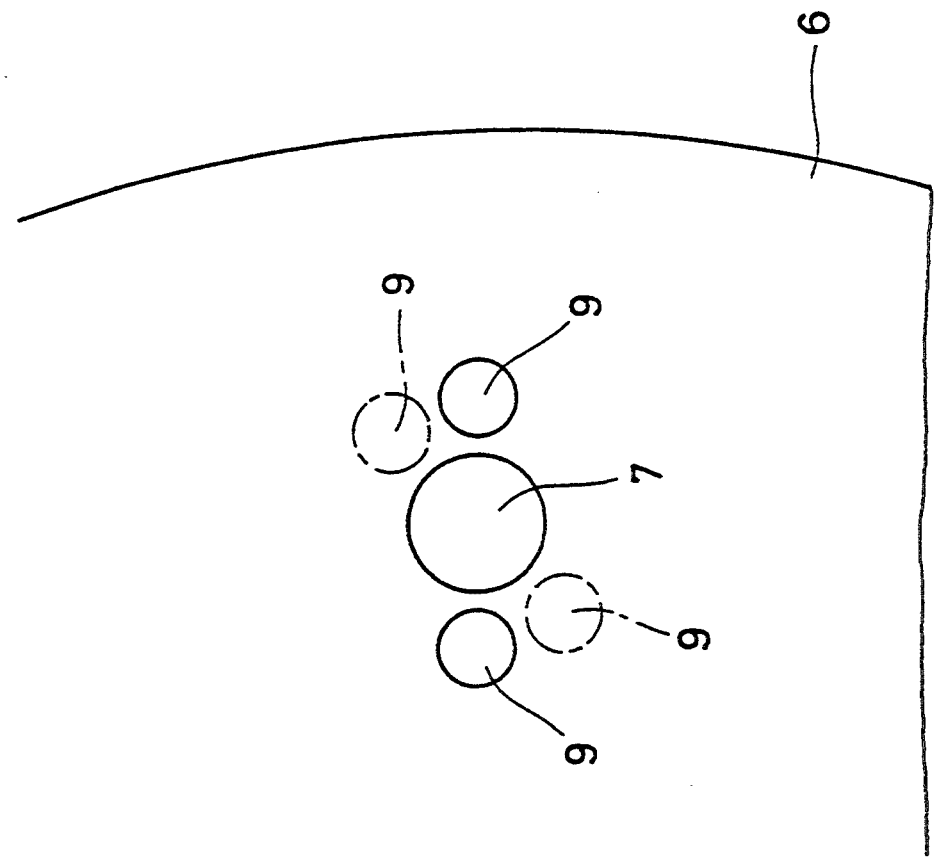
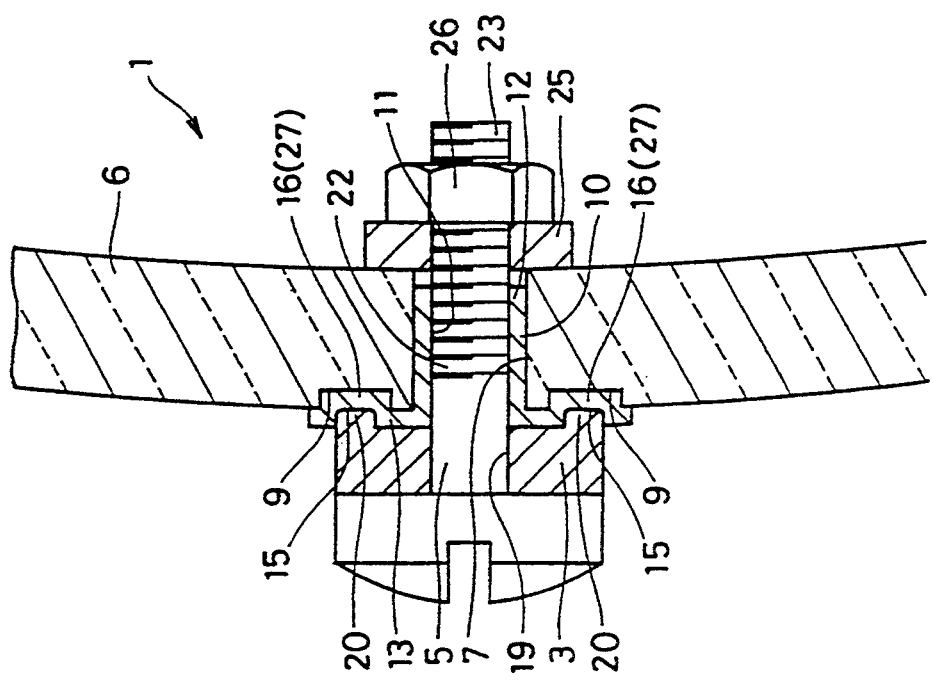

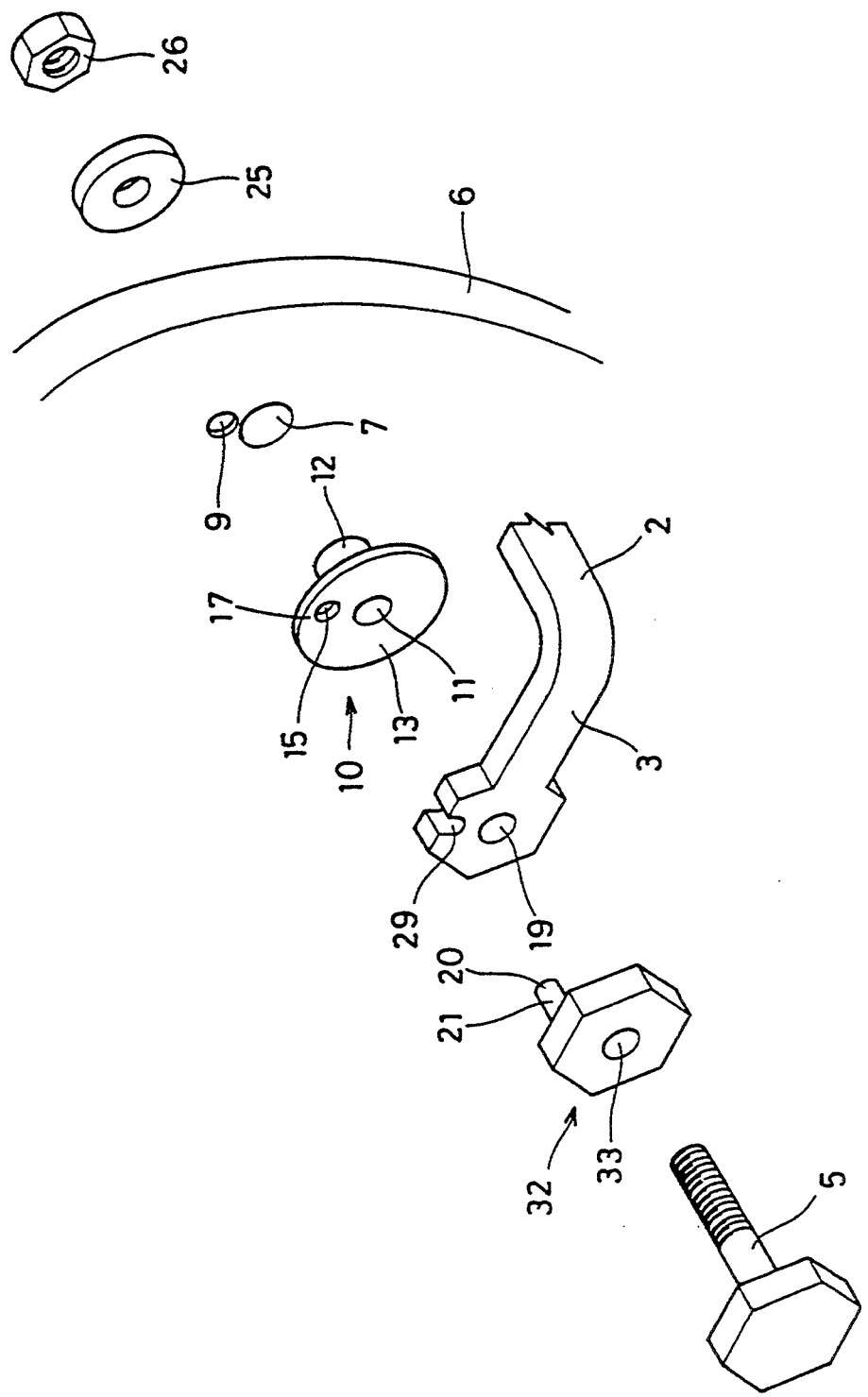

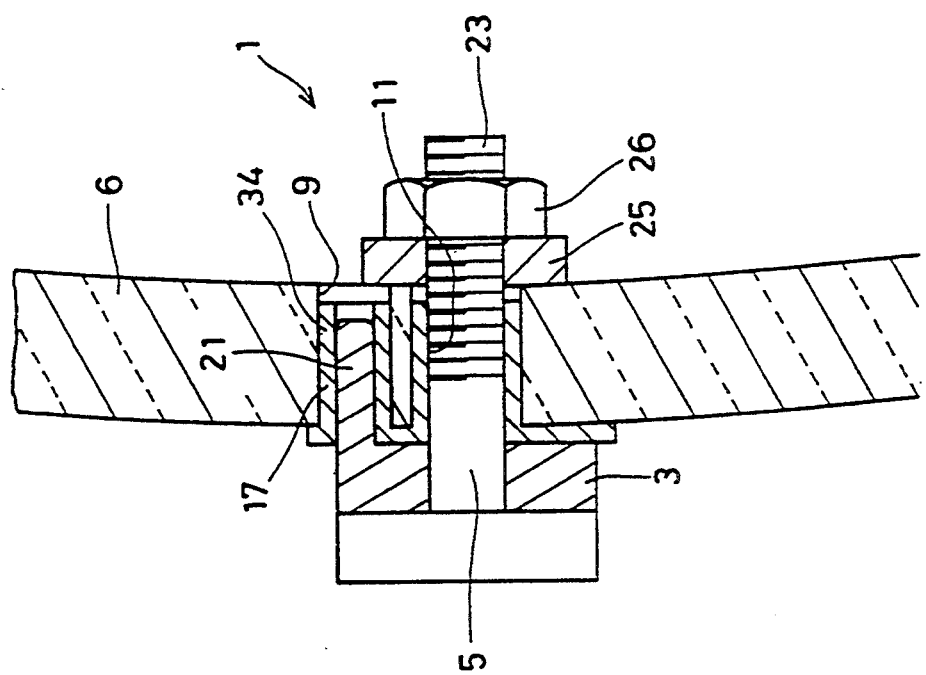
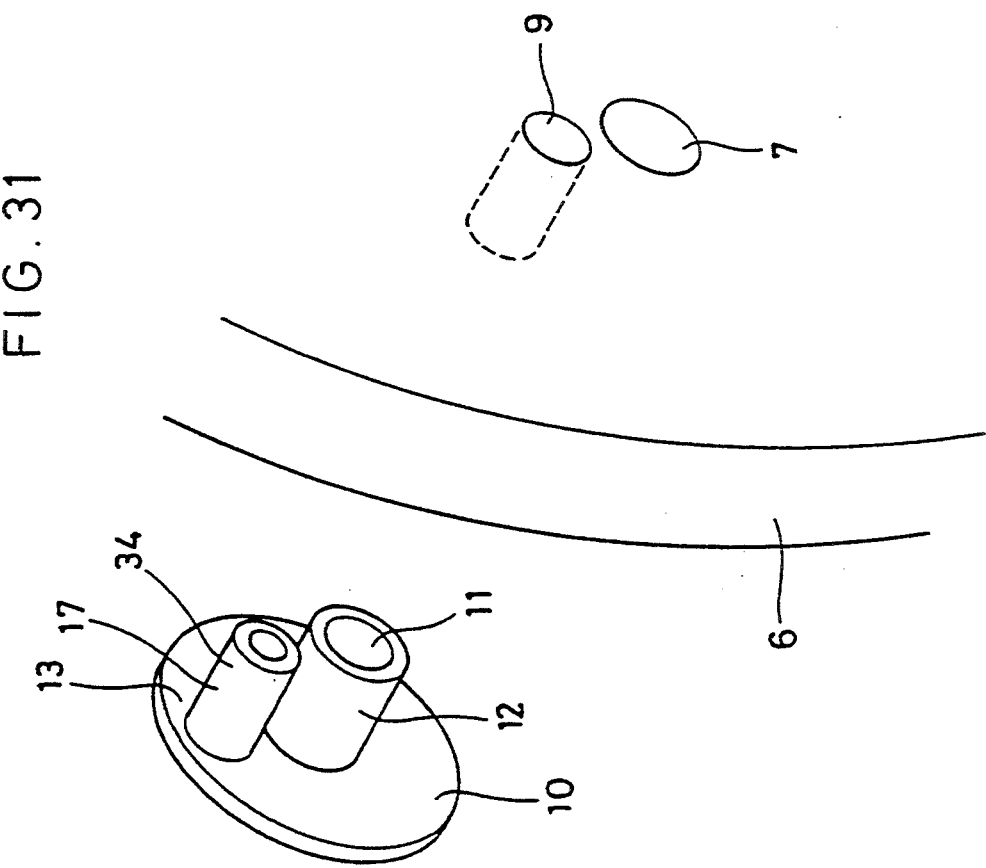

LENS COUPLING STRUCTURE FOR RIMLESS EYEGLASSES

BACKGROUND OF THE INVENTION

This invention relates to a lens coupling structure for rimless eyeglasses used to couple a coupling portion of a bridge or a temple to a lens.

A conventional coupling structure for rimless eyeglasses of this type is shown in FIGS. 35 and 36.

Namely, in this arrangement, the end of a coupling portion c of the bridge or the temple is soldered to a curved abutting piece b kept in abutment with a curved edge a of the lens. The abutting piece b is in turn soldered to a coupling piece e extending inwardly along the front side of the lens and formed with a through hole d in its inner end. With the through hole d of the coupling piece e aligned with a coupling hole f formed in the lens, a coupling screw g is inserted in the through hole d and the coupling hole f. Then, a nut i is screwed onto the end of a threaded shank h of the screw protruding from the other side of the lens to fix the coupling portion c to the lens.

Thus, in the prior art arrangement, in order to couple the bridge and the temples to the respective lenses, a plurality of small parts had to be soldered to each other and to the coupling portions c. Thus, the productivity was low since many manufacturing steps were necessary. Further, since a plurality of portions have to be soldered to form the coupling portion, when the coupling portion is bent to adjust the degree of opening of the temple, such soldered portions are likely to be peeled off or damaged.

Moreover, when bending the coupling portion to adjust the degree of opening of the temple, if it is inadequately bent, the abutting piece may be pressed hard against the edge of the lens. This often caused chippings or cracks on the lens due to the stress exerted on the lens.

An object of the present invention is to provide a lens coupling structure for rimless eyeglasses which can obviate the above problems.

SUMMARY OF THE INVENTION

According to the present invention, there is provided a lens coupling structure for rimless eyeglasses for coupling a bridge connecting a pair of lenses or a temple corresponding lens. The coupling structure comprises a flanged bush made of a resin. The lens is formed with a hole and a recess arranged near the hole, the recess being in the form of a blind hole or a through hole. The flanged bush comprises a cylindrical portion and a flange formed around one end of the cylindrical portion, the flanged bush being formed with a screw hole at the center thereof. A coupling portion of the bridge or temple has a screw hole and a protrusion protruding toward the lens. The cylindrical portion of the flanged bush is inserted in the hole of the lens, a threaded shank of a fixing screw is inserted from one side of the lens into the screw hole in the coupling portion, the screw hole in the flanged bush and the hole in the lens, and a nut is screwed onto the end of the threaded shank of the fixing screw protruding from the other side of the lens and the fixing screw is tightened until the protrusion pushes a portion of the flange from the front side thereof to bring the flanged bush into engagement with the lens.

The above-mentioned coupling portion of the bridge or temple may have a screw hole, and a notch or a bore, and a fixing screw may have a threaded shank provided with a protrusion protruding toward the lens, so that the protrusion will be received in the notch or the bore.

As an alternative, the coupling portion may have a seating plate having a screw hole and a protrusion protruding toward the lens, so that the protrusion of the seating plate will be received in the notch or the bore.

In the above coupling structure, the bore and the recess in the lens may be spaced apart with each other or communicate with each other at one side of the lens.

Further, in the above structure, the flange may comprise a projection formed on one side thereof and a depressed portion formed on the other side thereof, so that the end of the protrusion sinks into the depressed portion and that the projection is pushed into the recess. In this case, the depressed portion has an open bottom.

Also, when the nut is screwed on the threaded shank of the fixing screw protruding from the other side of the lens and the fixing screw is tightened, the protrusion deforms the one portion of the flange on one side thereof, so that a corresponding portion on the other side of the flange will form a projection so as to fit in the recess on the lens.

In the coupling structure according to the present invention, by screwing the nut onto the threaded shank of the screw protruding from the rear side of the lens and tightening it, the end of the protrusion, integral with or fixed to the coupling portion, sinks into the surface of the flange. At the same time, the rear surface of the flange will engage in the recess. Thus, the temple and the bridge are fixedly and unrotatably coupled to the lens.

In one specific arrangement, the protrusion formed on the rear surface of the screw head of the fixing screw is inserted into the notch or the bore formed in the coupling portion, to fixedly couple the coupling portion to the protrusion and thus the screw. In another arrangement, the protrusion formed on the seating plate that is disposed between the coupling portion and the screw head of the fixing screw is inserted in the notch or the bore of the coupling portion to fixedly couple the coupling portion, to the protrusion and thus to the seating plate.

In still another arrangement, the flange is provided with the engaging portion comprising the depressed portion on the front surface and the projection on the rear surface. By tightening the nut, the end of the protrusion will sink in the depressed portion and the projection formed opposite thereto will be pushed into the recess so as not to disengage therefrom. Even if the flange is not formed with the engaging portion, simply by tightening the nut, the end of the protrusion will sink into the front surface of the flange, thus forming a projection on the other side which will fit in the recess so as not to disengage therefrom.

According to the present invention, the coupling portion of the bridge and the temple can be coupled to the lens without soldering, which is not only bothersome but also sometimes requires a special soldering condition depending on the material used. Thus, this structure will improve the manufacturing efficiency.

Also, there will be no peeling or breakage of soldered parts even when the coupling portion is bent to adjust the degree of opening of the temple.

Further, since the abutting piece abutting with the lens edge is not provided, the conventional problems such as chipping or cracking of the lens will be obviated.

BRIEF DESCRIPTION OF THE DRAWINGS

Other features and objects will become apparent from the following description made with reference to the accompanying drawings, in which:

FIG. 1 is a perspective view of a first embodiment in which a temple is coupled to a lens through a coupling portion;

FIG. 2 is a perspective view of the same in which a bridge is coupled to the lens through the coupling portion;

FIGS. 5 and 6 are sectional views of the same showing the state when the coupling portion is coupled to the lens;

FIG. 7 is a front view of the lens showing how a pair of recesses are formed;

FIG. 19 is an exploded perspective view of the same showing a coupling structure;

FIG. 31 is a perspective view of still another embodiment showing a lens and a flanged bush;

FIG. 32 is a sectional view of the same showing the state when a coupling portion is coupled to the lens;

DETAILED DESCRIPTION OF THE PREFERRED EMBODIMENTS

Figure 3:
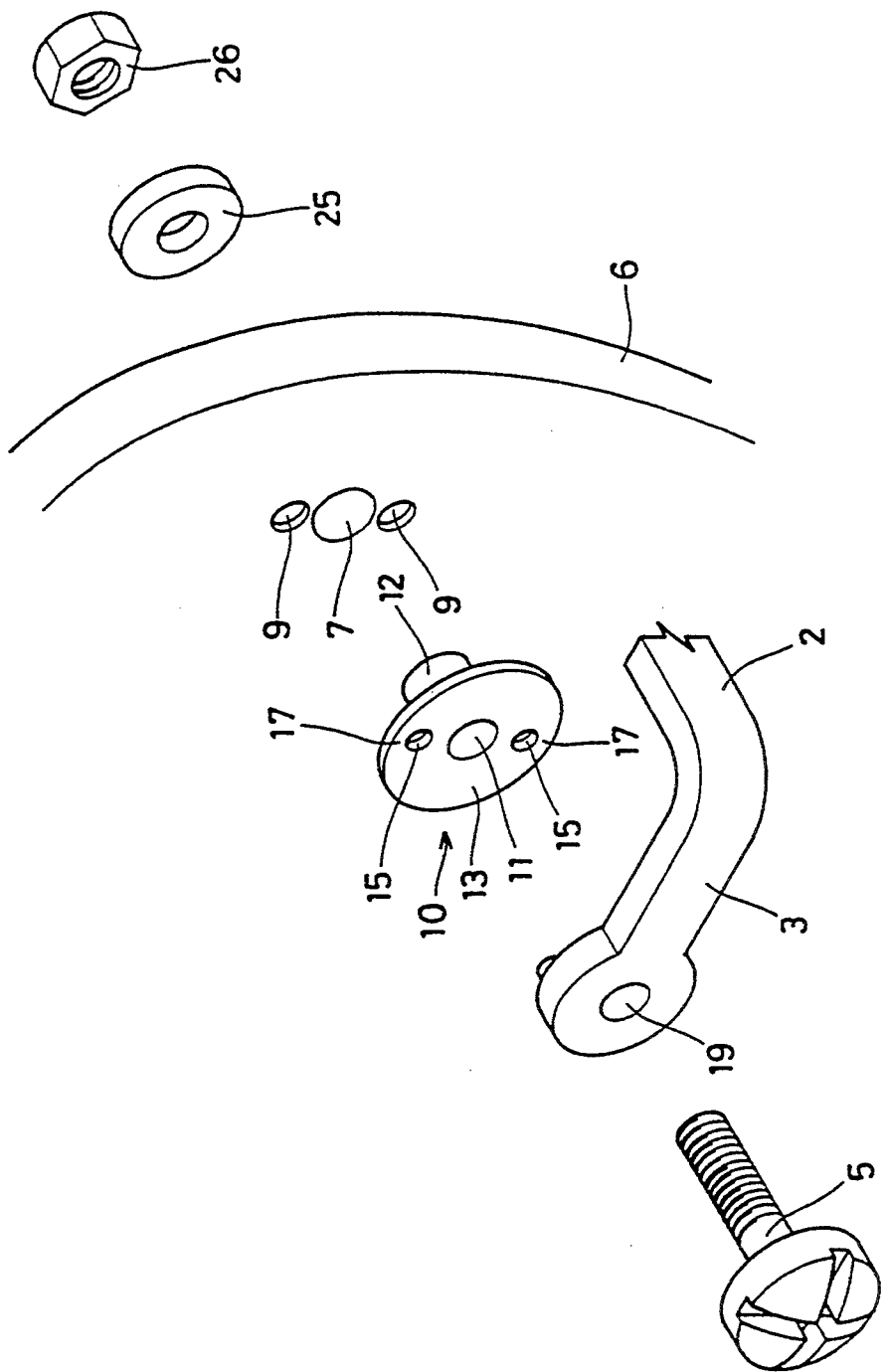
FIG. 3 is an exploded perspective view of the same showing the coupling structure.

Now we shall explain the embodiment with reference to the drawings.

First Embodiment

A lens coupling structure 1 according to the present invention is used to couple a coupling portion 3 of a temple 2 (FIG. 1) or a coupling portion 3 of a bridge 4 (FIG. 2) to a lens 6 by means of a fixing screw 5. We shall explain only the coupling structure for the temple 2 hereinbelow.

As shown in FIG. 3, the lens 6 is formed near the outer edge thereof with a circular hole 7 and a pair of recesses 9 immediately over and under the hole 7. In the figure, each recess 9 is in the form of a circle.

Figure 4:
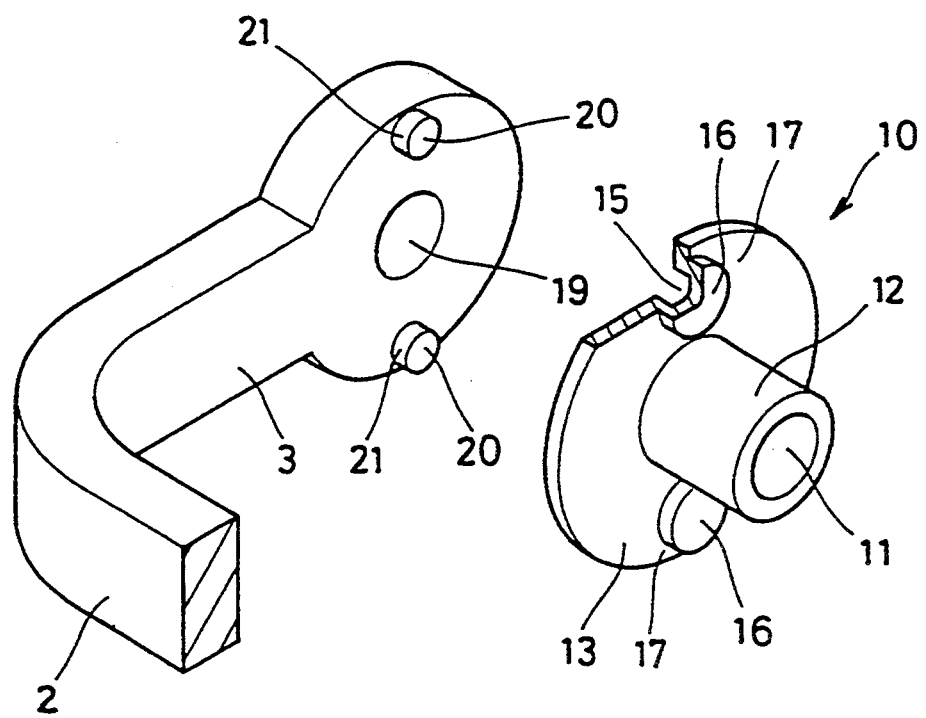
FIG. 4 is a perspective view of the same showing the coupling portion and a flanged bush.

A flanged bush 10, made of a resin such as nylon, is received in the hole 7. As shown in FIGS. 3 and 4, the flanged bush 10, inserted tightly in the hole 7, comprises a cylindrical portion 12 having a screw hole 11 at the center thereof, and a flange 13 formed at one end of the cylindrical portion 12. The flange 13 has engaging portions 17 which are depressions 15 as viewed from the front side and projections 16 as viewed from the rear side. The cylindrical portion 12 of the flanged bush 10 is inserted in the hole 7 so that the projections 16 fit in the recesses 9.

As shown in FIG. 4, the inner end of the coupling portion 3 of the temple 2 is in the form of a circular plate having a screw hole 19 in the center thereof and a pair of protrusions 21 formed on the rear side thereof over and under the screw hole 19. The protrusions 21 have their ends 20 protruding toward the lens 6 so as to engage in the upper and lower depressed portions 15 in the flanged bush 10.

Figure 5:
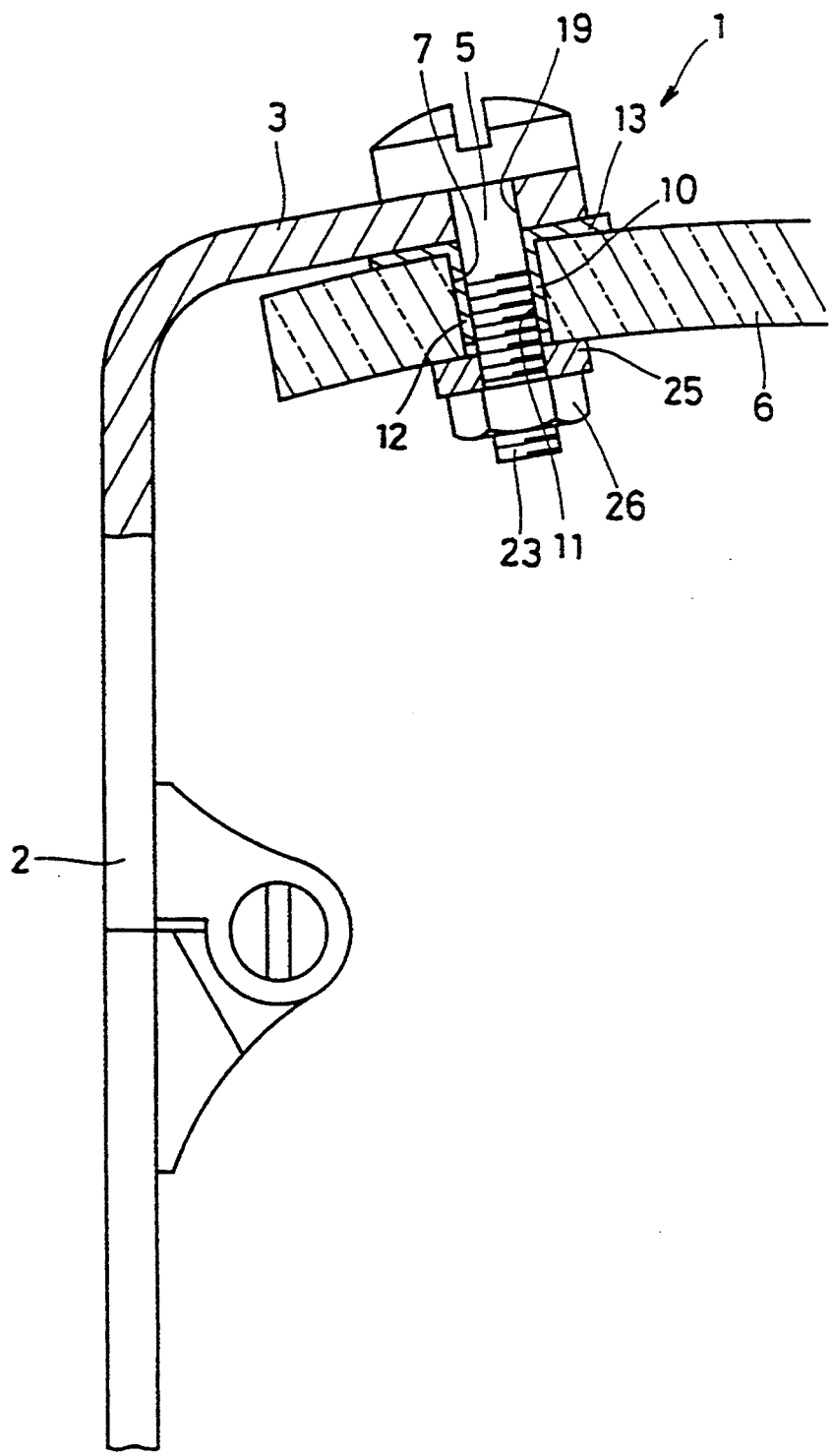

FIGS. 5 and 6 show how the temple and the lens are coupled together. First, the cylindrical portion 12 of the flanged bush 10 is pushed into the hole 7 so that the upper and lower projections 16 protruding from the flanged bush 10 fit in the recesses 9. Thereafter, the ends 20 of the protrusions 21 on the coupling portion 3 are pushed into the upper and lower depressed portions 15 of the flanged bush 10 so that the coupling portion 3 of the temple 2 overlies the flange 13. Next, a shank 22 of the fixing screw 5 is inserted through the screw holes 19 and 11 of the coupling portion 3 and of the flanged bush 10, respectively. A washer 25 is placed and a nut 26 is screwed onto the end of the shank 22 protruding from the opposite side of the lens. The nut is tightened until the protrusions 21 are completely pushed into the depressed portions 15 and the projections 16 into the recesses 9. In this state, the coupling portion 3 of the temple 2 is fixedly and unrotatably coupled to the lens 6.

With this coupling structure, the flange 13 may not be provided with the aforementioned engaging portions 17. In this case, too, the temple and the lens can be coupled together in exactly the same manner as in FIG. 6. Namely, by screwing the nut 26 onto a threaded shank 23 protruding from the rear side of the lens and tightening it, the protrusions 21 are pressed against the front surface of the flange 13, thus depressing the flange so that projections 27 are formed on the other side of the flange. The projections 27 thus formed are pushed into the recesses 9 so as not to disengage therefrom. Thus, the coupling portion 3 is unrotatably coupled to the lens 6.

Figure 9:
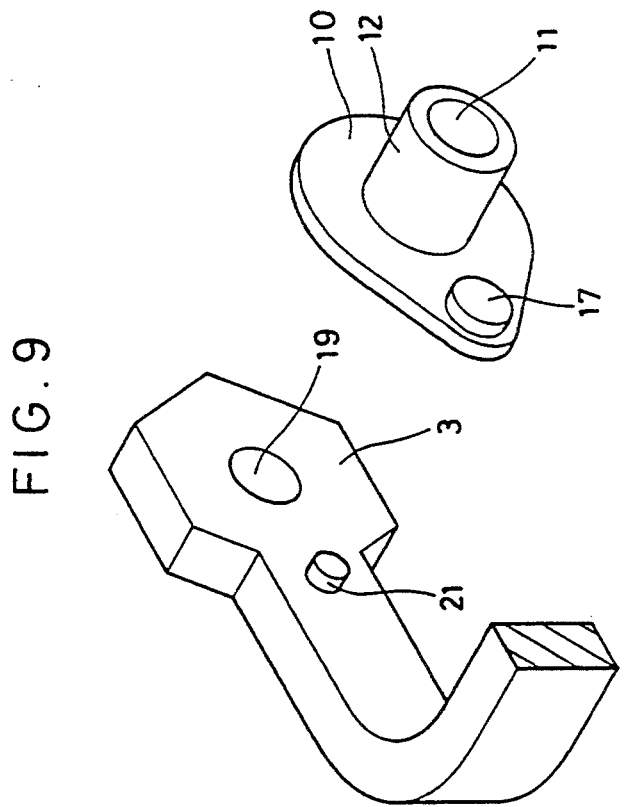
FIG. 9 is a perspective view showing a protrusion corresponding to the recess of FIG. 8 and the flanged bush.
Figure 8:
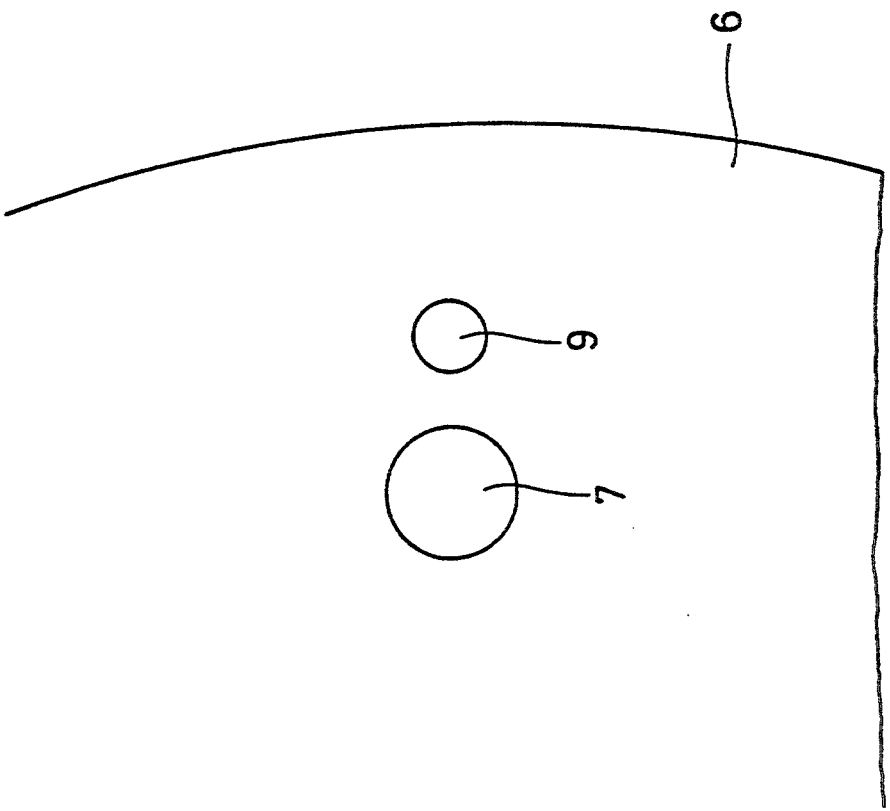
FIG. 8 is a front view of the lens showing how one recess is formed.

Two recesses 9 may be arranged over and under the hole 7 as described above, on both sides of the hole 7 as shown by solid lines by FIG. 7 or obliquely as shown in a chain line. The engaging portions 17 and the protrusions 21 are formed in the flanged bush 10 and in the coupling portion 3, respectively, at positions corresponding to the recesses 9. In FIG. 8, the lens 6 is formed with only one recess 9, which is spaced apart from the hole 7. In this case, as shown in FIG. 9, only one engaging portion 17 and only one protrusion 21 are formed on the flanged bush 10 and on the coupling portion 3, respectively, so as to align with the recess 9.

In any of above embodiments, the fixing screw 5 may be inserted into the lens 6 from its rear side. In that case, the nut 26 is screwed onto the end of the threaded shank 23 which protrudes from the front side of the lens 6. Also, the flanged bush 10 and the coupling portion 3 may be provided on the rear side of the lens 6. In this case, the fixing screw 5 may be inserted either from the rear or front side of the lens.

Second Embodiment

Figure 11:
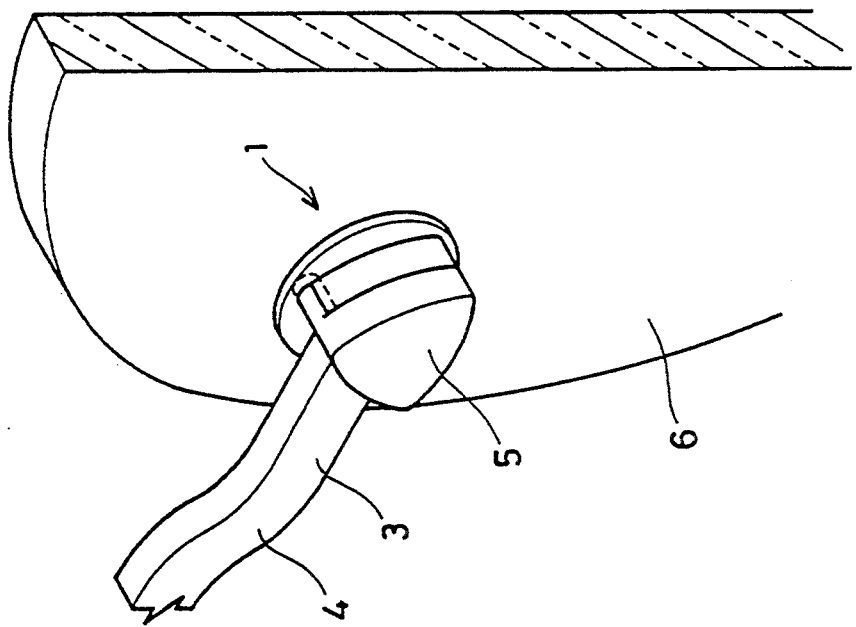
FIG. 11 is a perspective view of the same in which the bridge is coupled to a lens by a fixing screw.
Figure 10:
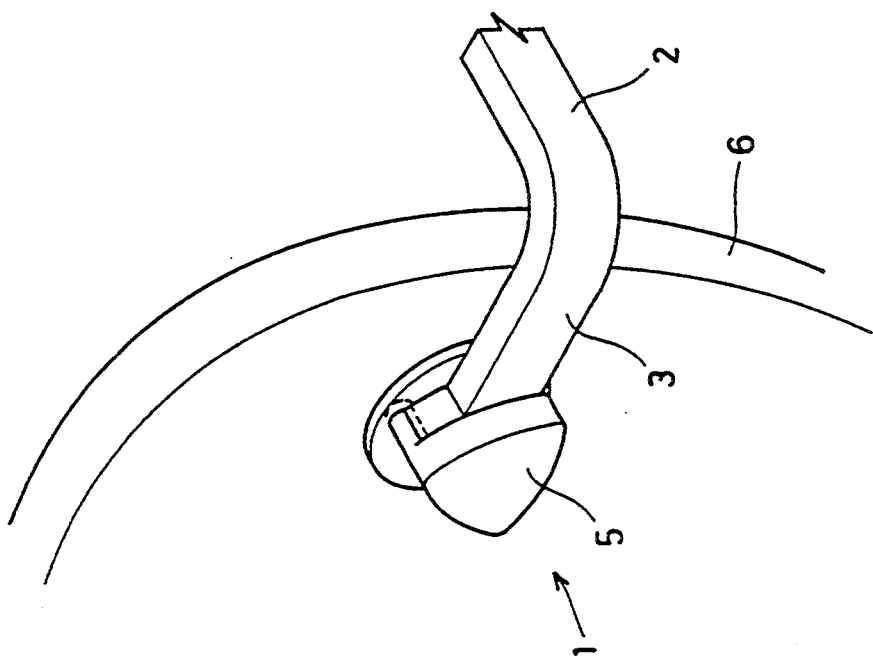
FIG. 10 is a perspective view of a second embodiment in which a temple is coupled to a lens by a fixing screw.

The lens coupling structure 1 according to the Second Embodiment is used to couple the coupling portion 3 of the temple 2 (FIG. 10) or the coupling portion 3 of the bridge 4 (FIG. 11) to the lens 6 by means of the fixing screw 5. We shall explain only the coupling portion for the temple 2 hereinbelow.

Figure 12:
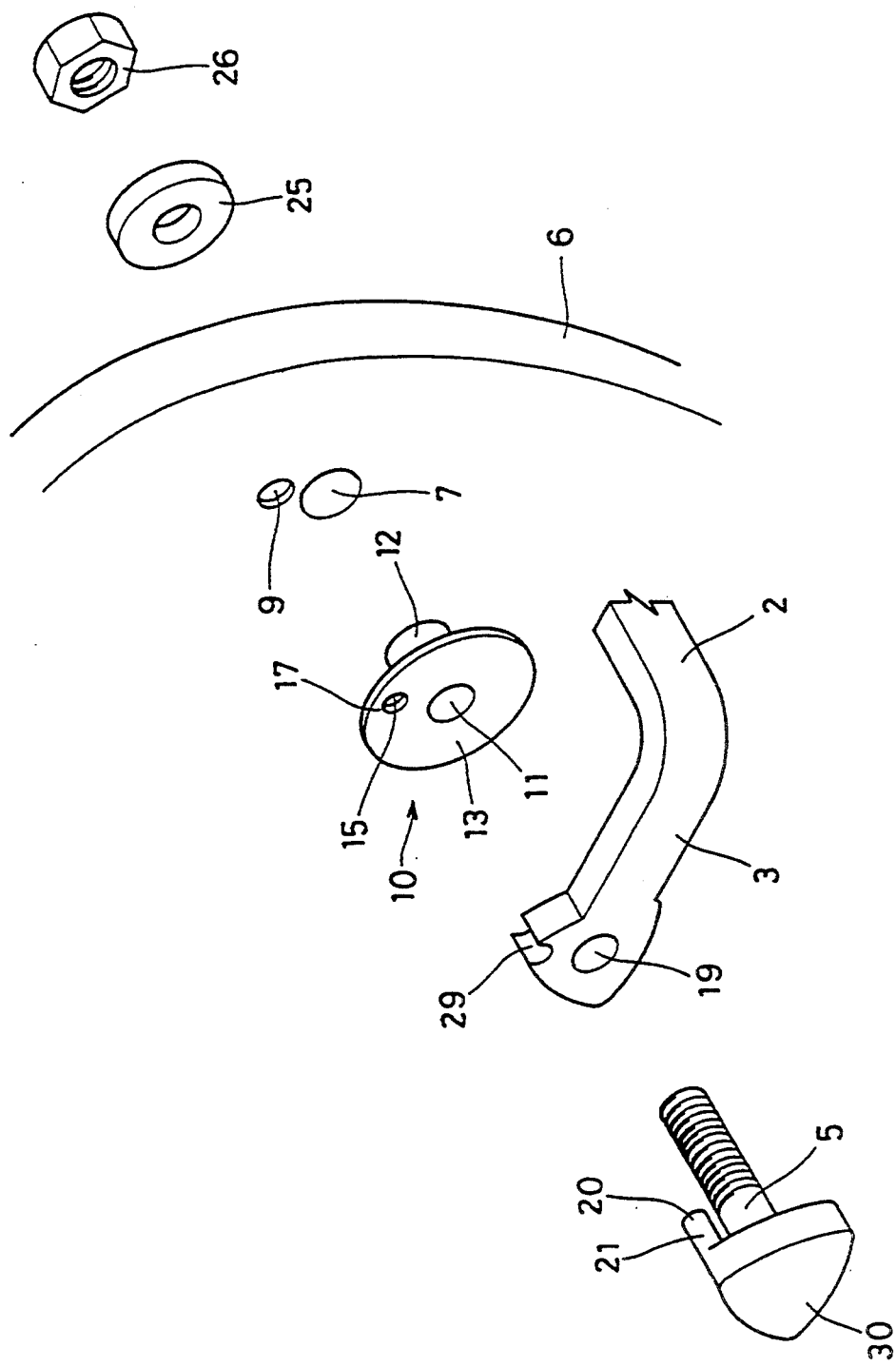
FIG. 12 is an exploded perspective view of the same showing a coupling structure.

As shown in FIG. 12, the lens 6 is formed near the outer edge thereof with the circular hole 7 and the recess 9 near the hole 7. In the figure, the recess 9 is in the form of a circle.

Figure 13:
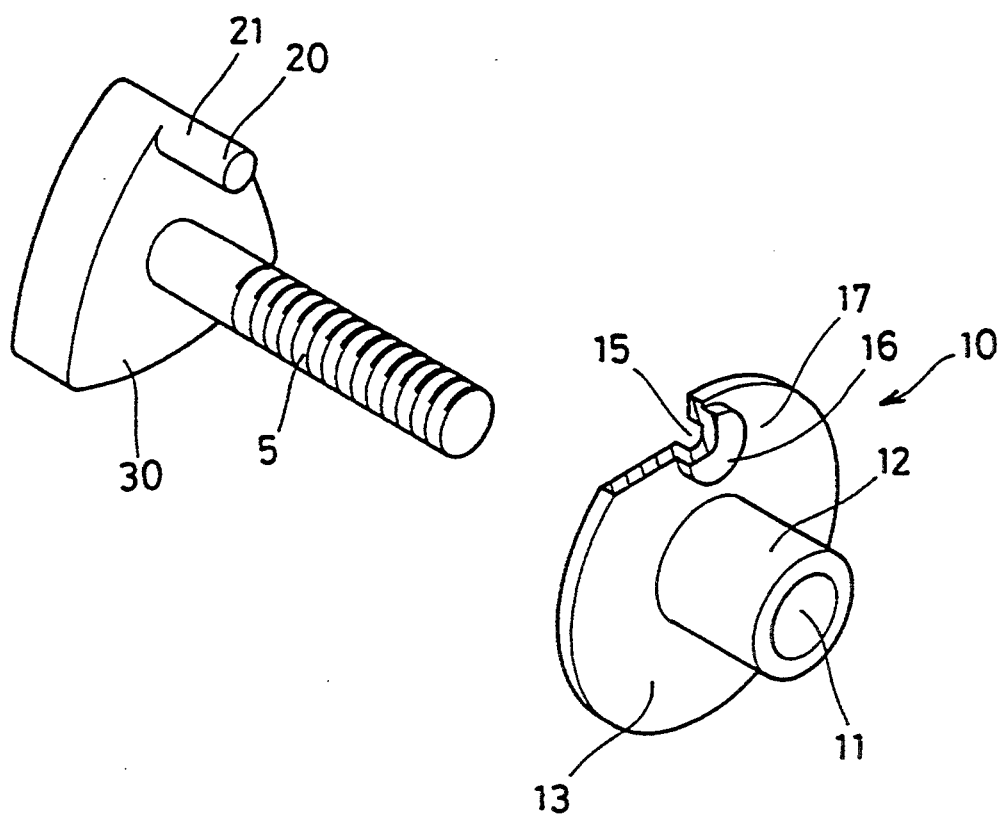
FIG. 13 is a perspective view showing the fixing screw and a flanged bush.

The flanged bush 10, made of a resin such as nylon, is received in the hole 7. As shown in FIGS. 12 and 13, the flanged bush 10 comprises the cylindrical portion 12 having the screw hole 11 at the center thereof, and the flange 13 formed at one end of the cylindrical portion 12. The flange 13 has the engaging portion 17, which is the depression 15 as viewed from the front side and the projection 16 as viewed from the rear side. The cylindrical portion 12 of the flanged bush 10 is inserted in the hole 7 so that the projection 16 fits in the recess 9.

As shown in FIG. 12, the inner end of the coupling portion 3 of the temple 2 is in the form of a triangular plate having the screw hole 19 and a notch 29 of a semicircular shape at the center and the upper end thereof, respectively.

A screw head 30 of the fixing screw 5 has a rear surface formed with the protrusion 21 having the end 20, which is inserted in the notch 29 and come into engagement with the depressed portion 15.

Figure 14:
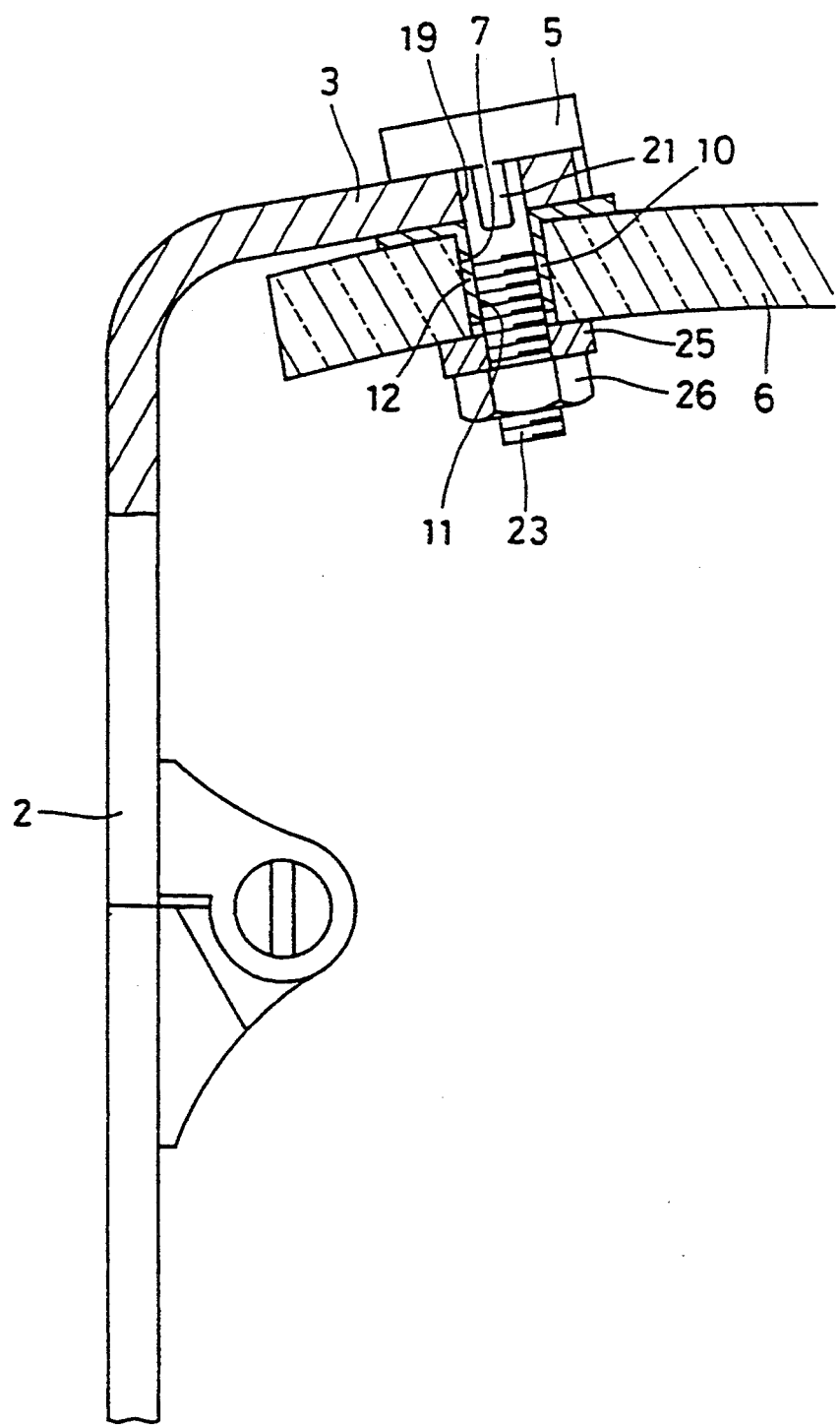
FIGS. 14 and 15 are sectional views of the same showing the state when the coupling portion is coupled to the lens.
Figure 15:
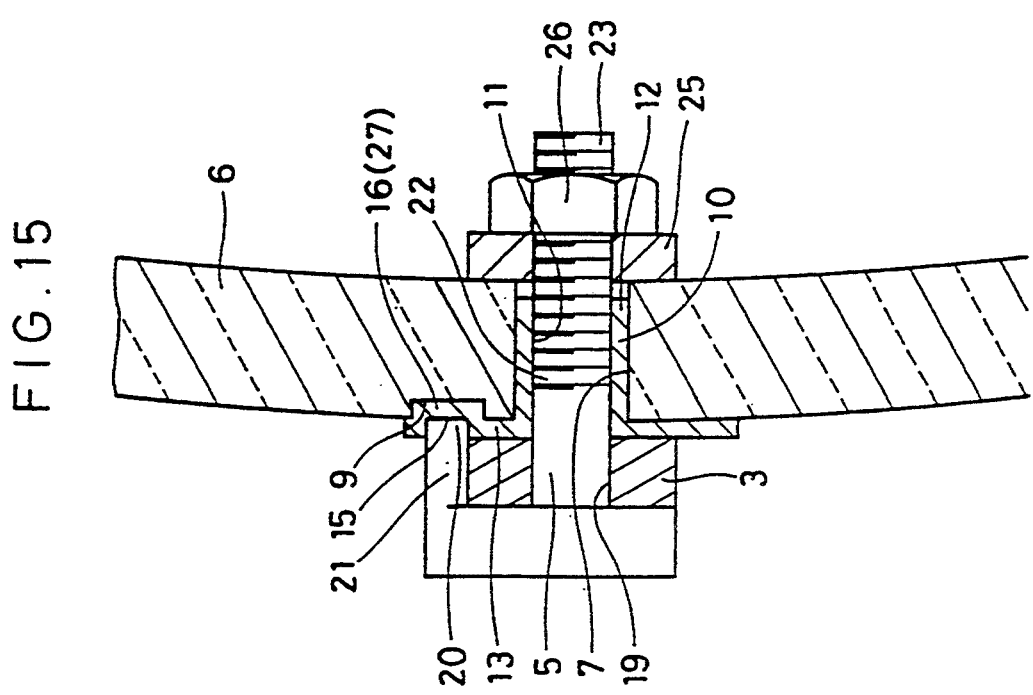

FIGS. 14 and 15 show how the temple and the lens are coupled together. First, the cylindrical portion 12 is pushed into the hole 7 so that the projection 16 protruding from the flanged bush 10 fits in the recess 9. Next, the shank 22 of the fixing screw 5 is inserted through the screw holes 19 and 11 of the coupling portion 3 and of the flanged bush 10, respectively. The end 20 of the protrusion 21 provided at the screw head 30 is inserted in the recess 9 and in the notch 29 (FIG. 12) formed on the coupling portion 3 so that the end 20 will engage in the depressed portion 15 of the flanged bush 10. Then, the threaded shank 23 protruding from the rear side of the lens 6 is fixedly and unrotatably tightened by means of the nut 26 and the washer 25 at the rear side of the lens. The end 20 is completely pushed into the depressed portion 15 and the projection 16 into the recess 9. Thus, the notch 29 formed on the coupling portion 3 will come into the engagement with the fixed protrusion 21. In other words, the coupling portion 3 of the temple 2 is fixedly and unrotatably coupled to the lens.

With this coupling structure, the flange 13 may not be provided with the aforementioned engaging portion. In this case, too, the temple and the lens can be coupled together in exactly the same manner as in FIG. 15. Namely, by screwing the nut 26 onto the threaded shank 23 protruding from the rear side of the lens and tightening it, the end 20 of the protrusion 21 is pressed against the front surface of the flange 13, thus depressing the flange so that the projection 27 is formed on the other side of the flange. The projection 27 thus formed is pushed into the recess 9 so as not to disengage therefrom. Thus, the coupling portion 3 is unrotatably coupled to the lens 6.

Figure 16:
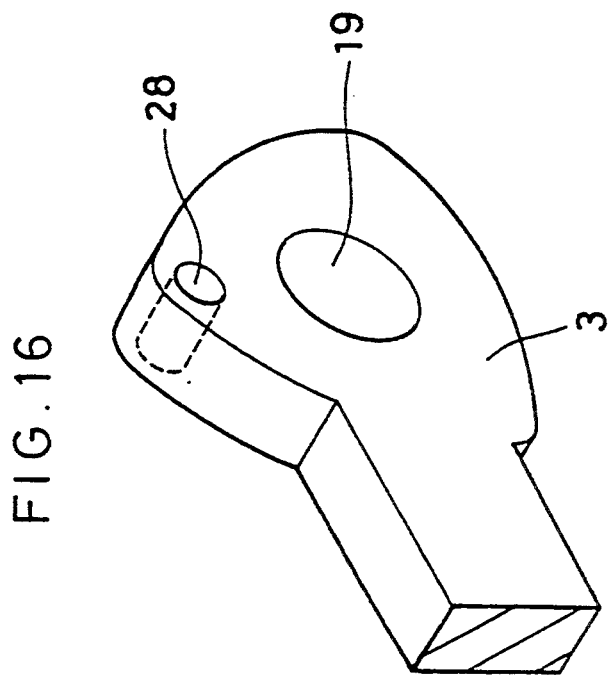
FIG. 16 is a perspective view of the coupling portion having a bore.

FIG. 16 shows another embodiment in which instead of providing the notch 29 on the coupling portion 3, a bore 28 is provided to accommodate the protrusion 21. When the protrusion 21 engages in the bore 28 and the threaded shank 23 protruding from the rear side of the lens is tightened by means of the nut 26, the coupling portion 3 is coupled by the protrusion 21 in a fixed manner.

In the Second Embodiment, as in the First Embodiment, a plurality of recesses 9 may be provided around the hole 7. In this case, the engaging portions 17, the notches 29 or bores 28 and the protrusions 21 are formed in the flange 13, in the coupling portion 3 and in the screw head 30 of the fixing screw 5, respectively, at positions corresponding to the recess 9.

In any of above embodiments, the flanged bush 10 and the coupling portion 3 may be provided at the rear side of the lens 6 and the fixing screw 5 may be inserted through the screw holes 11 and 19 from the rear side of the lens.

Third Embodiment

Figure 18:
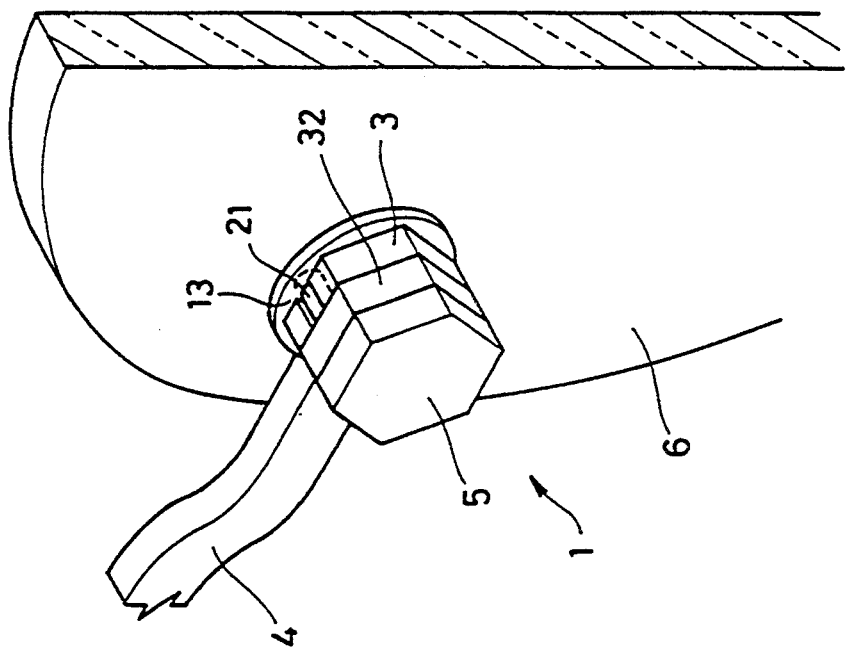
FIG. 18 is a perspective view of the same in which a bridge is coupled to a lens by a seating plate.
Figure 17:
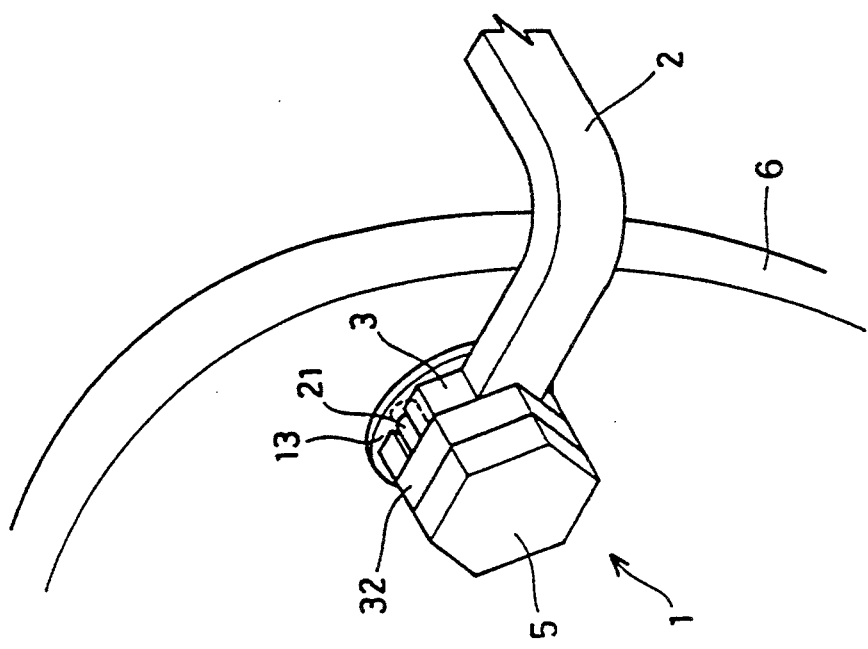
FIG. 17 is a perspective view of a third embodiment in which a temple is coupled to a lens by a seating plate.

The lens coupling structure 1 according to the Third Embodiment is used to couple the coupling portion 3 of the temple 2 (FIG. 17) or the coupling portion 3 of the bridge 4 (FIG. 18) by means of the fixing screw 5 and a seating plate 32. We shall explain only the coupling structure for the temple 2 hereinbelow.

Figure 20:
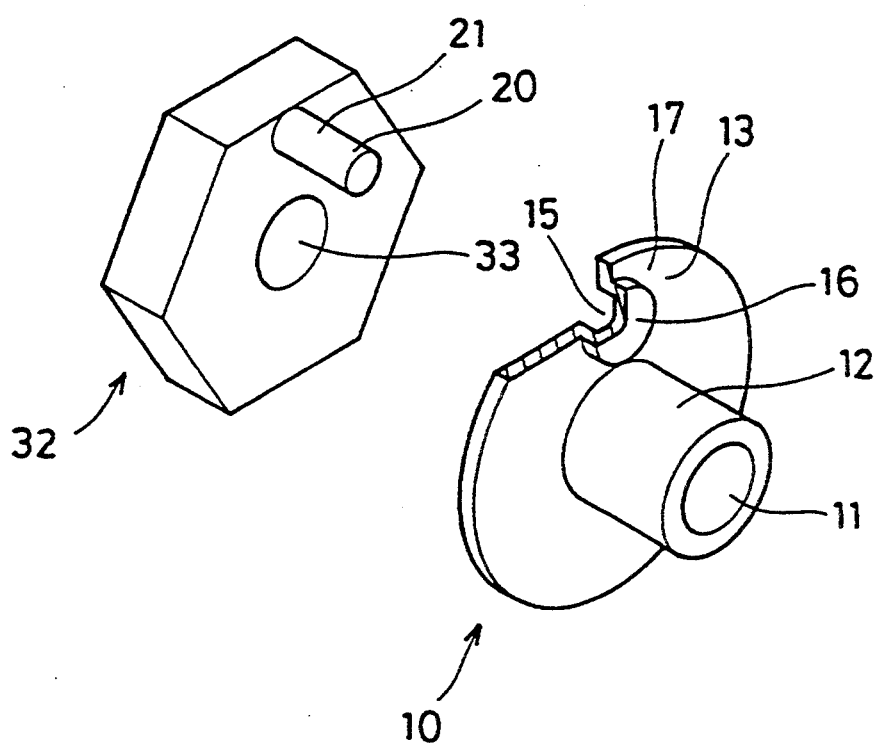
FIG. 20 is a perspective view of the same showing the seating plate and a flanged bush.

FIGS. 19 and 20 show the provision of the seating plate 32. Otherwise, the Third Embodiment is structurally the same as the Second Embodiment. Thus, like numerals are denoted by like parts and their description is omitted.

The inner end of the coupling portion 3 of the temple 2 is in the form of a hexagonal plate having the screw hole 19 and the notch 29 of a semi-circular shape at the center and the upper end thereof, respectively.

The seating plate 32 is e.g. in the form of a hexagonal plate having a screw hole 33 at the center thereof. The seating plate is provided with the protrusion 21 near the screw hole 33 on its rear side to be inserted in the notch 29, with its end 20 engaging with the depressed portion 15 of the flange 13.

Figure 21:
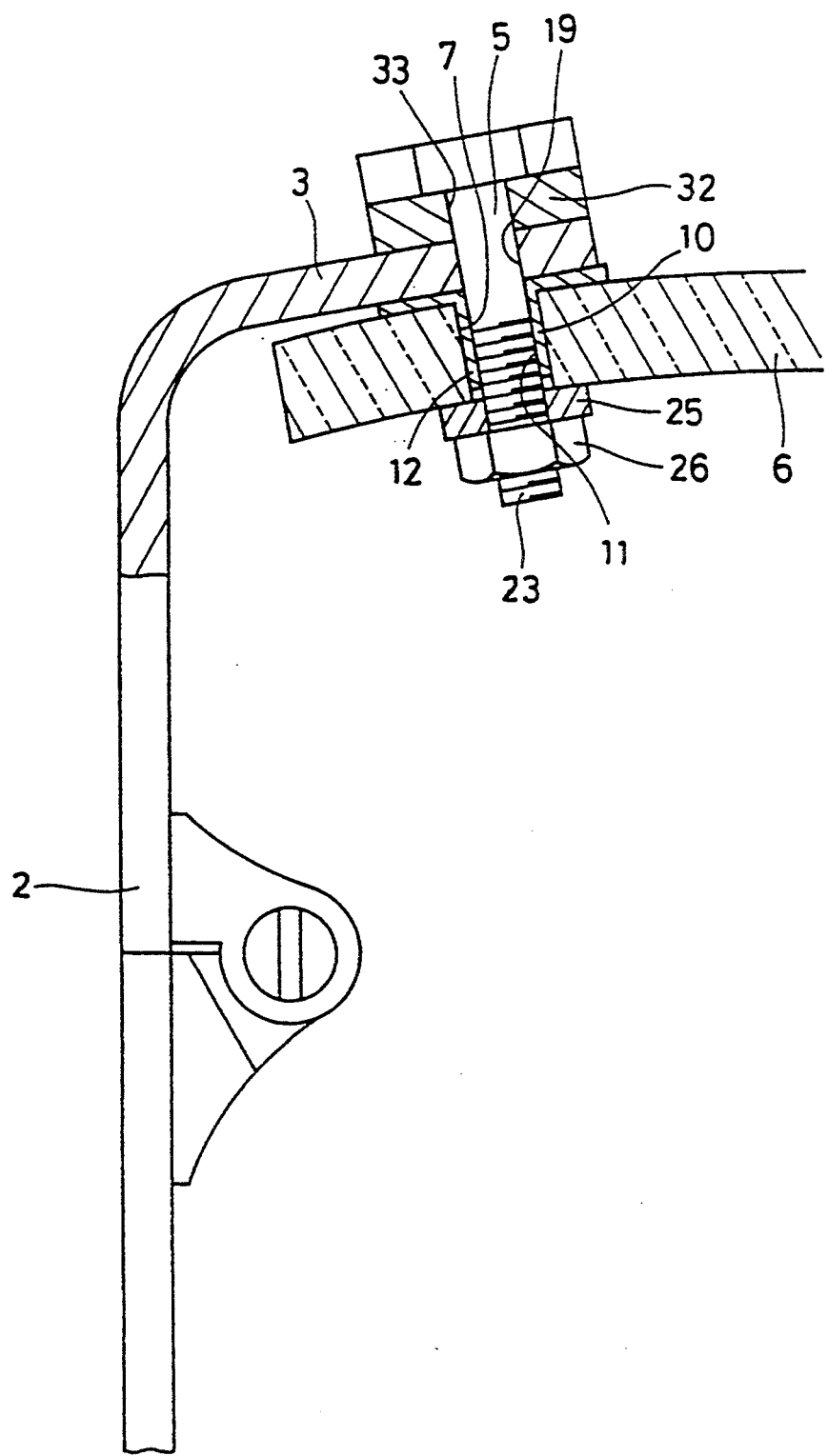
FIGS. 21 and 22 are sectional views of the same showing the state when the coupling portion is coupled to the lens.
Figure 22:
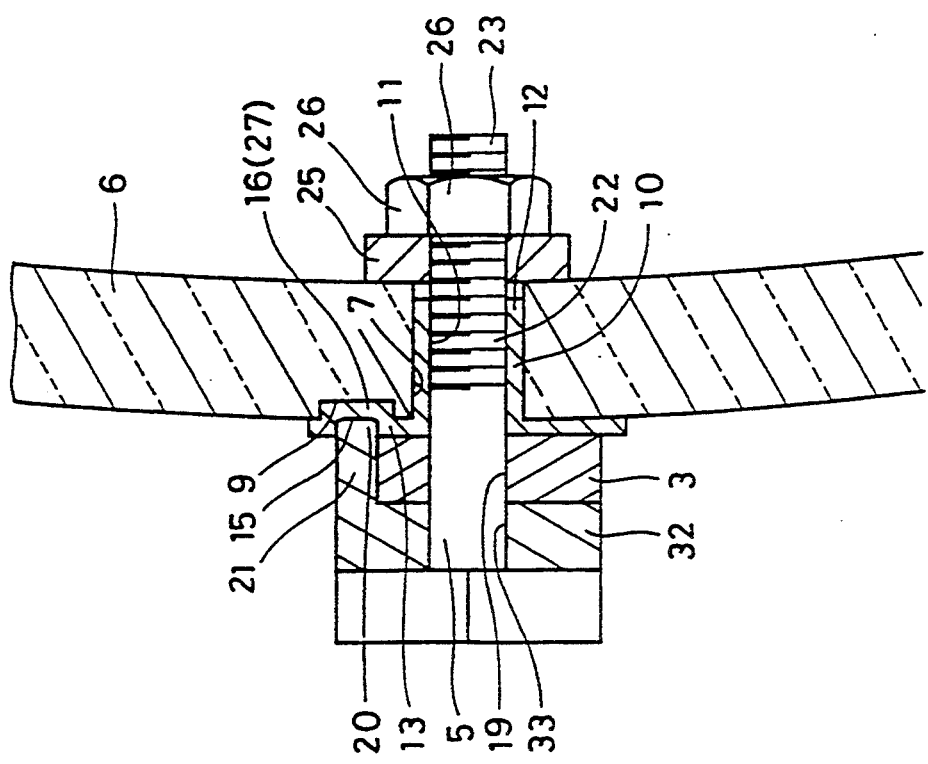

FIGS. 21 and 22 show how the temple and the lens are coupled together. First, the cylindrical portion 12 is pushed into the hole 7 so that the projection 16 protruding from the flanged bush 10 on the front side of the lens 6 fits in the recess 9. Next, the end 20 of the protrusion 21 provided at the seating plate 32 is inserted in the depressed portion 15 and then in the notch 29 (FIG. 19) formed on the coupling portion 3. The shank 22 of the fixing screw 5 is inserted from the front side of the lens 6 through the screw holes 33, 19 and 11 of the seating plate 32, the coupling portion 3 and the flanged bush 10, respectively. Then, the threaded shank 23 protruding from the rear side of the lens 6 is fixedly and unrotatably screwed by means of the nut 26 and the washer 25 provided at the rear side of the lens 6. The end 20 is completely pushed into the depressed portion 15 and the projection 16 into the recess 9. The seating plate 32 is unrotatably coupled, bringing the notch 29 formed on the coupling portion 3 into engagement with the fixed protrusion 21. In other words, the coupling portion 3 of the temple 2 is fixedly and unrotatably coupled to the lens.

With this coupling structure, the flange 13 may not be provided with the aforementioned engaging portion. In this case, too, the temple and the lens can be coupled together in exactly the same manner as in FIG. 22. Namely, by screwing the nut 26 onto the threaded shank 23 protruding from the rear side of the lens and tightening it, the end 20 of the protrusion 21 is pressed against the front surface of the flange 13, thus depressing the flange so that the projection 27 is formed on the other side of the flange. The projection 27 thus formed is pushed into the recess 9 so as not to disengage therefrom. Thus, the coupling portion 3 is unrotatably coupled to the lens 6.

Figure 23:
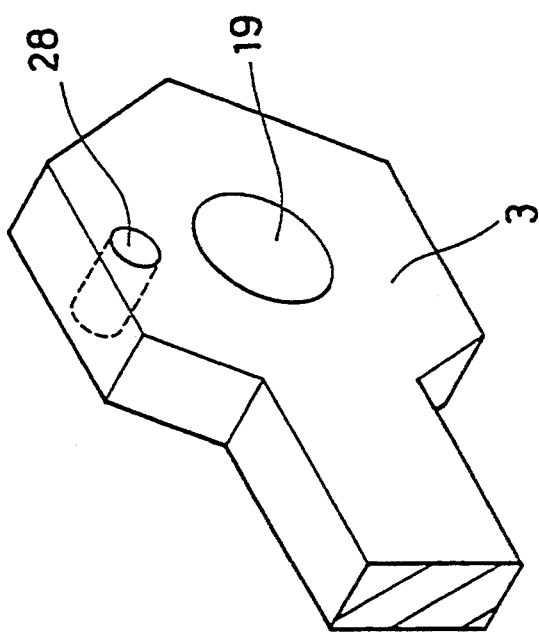
FIG. 23 is a perspective view of the coupling portion having a bore.

FIG. 23 shows another example in which, instead of providing the notch 29 on the coupling portion 3, the bore 28 is provided to accommodate the protrusion 21. Although the coupling portion 3 shown in FIG. 23 is different in shape from that shown in FIG. 16, its function is essentially the same and the description thereof is omitted.

In the Third Embodiment, as in the First Embodiment, a plurality of recesses 9 may be provided around the hole 7. In this case, the engaging portions 17, the notch 29 or the bore 28, and the protrusions 21 are formed in the flange 13, in the coupling portion 3 and in the seating plate 32, respectively, at positions corresponding to the recesses 9.

In any of above embodiments, the fixing screw 5 may be inserted into the lens 6 from its rear side. In that case, the nut 26 is screwed into the end of the threaded shank 23 which protrudes from the front side of the lens 6. Also, the flanged bush 10 and the coupling portion 3 may be provided on the rear side of the lens 6. In this case, the fixing screw 5 may be inserted either from the rear or front side.

Figure 24:
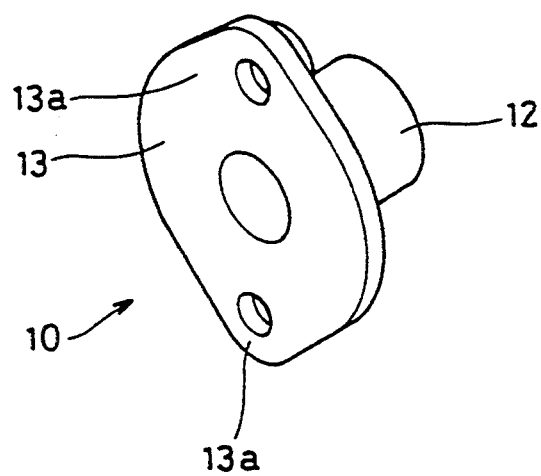
FIG. 24 is a perspective view of another embodiment showing a flanged bush formed with a pair of recesses.
Figure 25:
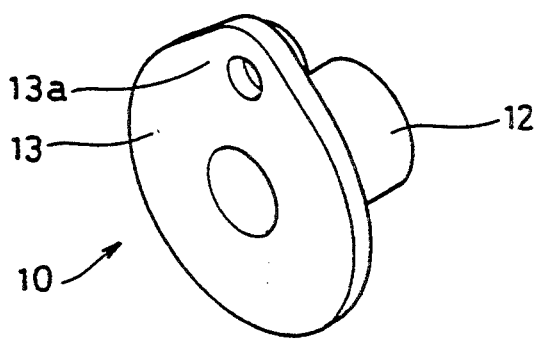
FIG. 25 is a perspective view of a still another embodiment showing a flanged bush formed with one recess.

Other Embodiments (1) In any of above embodiments, the flange 13 of the flanged bush 10 may be provided with a radial protrusion or protrusions 13a to cover the recess or recesses 9 as shown in FIGS. 24 and 25.

Figure 26:
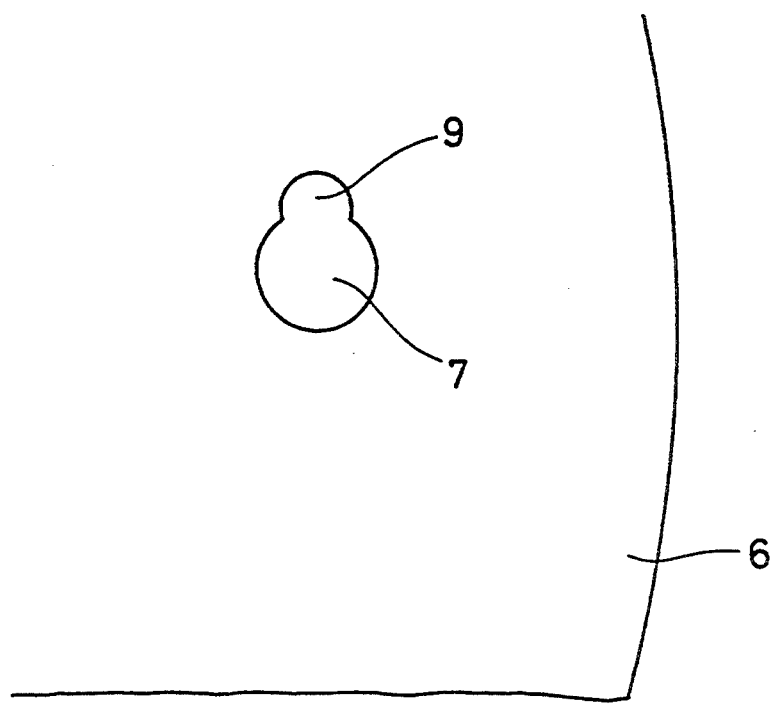
FIG. 26 is a front view of still another embodiment showing a lens in which a hole and a recess communicate with each other.
Figure 27:
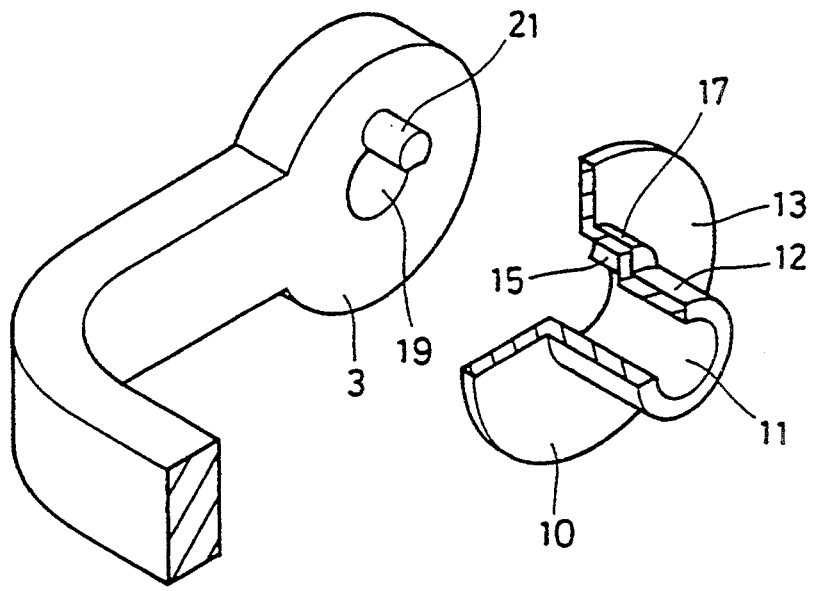
FIG. 27 is a perspective view of still another embodiment showing a flanged bush and a coupling portion.

(2) In any of above embodiments, the hole 7 and the recess 9 may be provided so as to communicate with each other as shown in FIG. 26. In this case, as shown in FIG. 27, the depressed portion 15 of the engaging portion 17 is formed so as to communicate with the screw hole 11 in the flange 13, and the coupling portion 3 is provided with the protrusion 21 adjacent to the screw hole 19. Alternatively, in the embodiment shown in FIG. 28, the depressed portion 15 of the engaging portion 17 communicates with the screw hole 11 in the flange 13, the bore 28 on the coupling portion 3 for inserting the protrusion 21 communicates with the screw hole 19, and the fixing screw 5 is formed with the protrusion 21 adjacent to the shank 22. Further, in the embodiment as shown in FIG. 29, the depressed portion 15 of the engaging portion 17 communicate with the screw hole 11 in the flange 13, the bore 28, through which the protrusion 21 is inserted, communicates with the screw hole 19, and the seating plate 32 is formed with the protrusion 21 adjacent to the screw hole 33.

Figure 28:
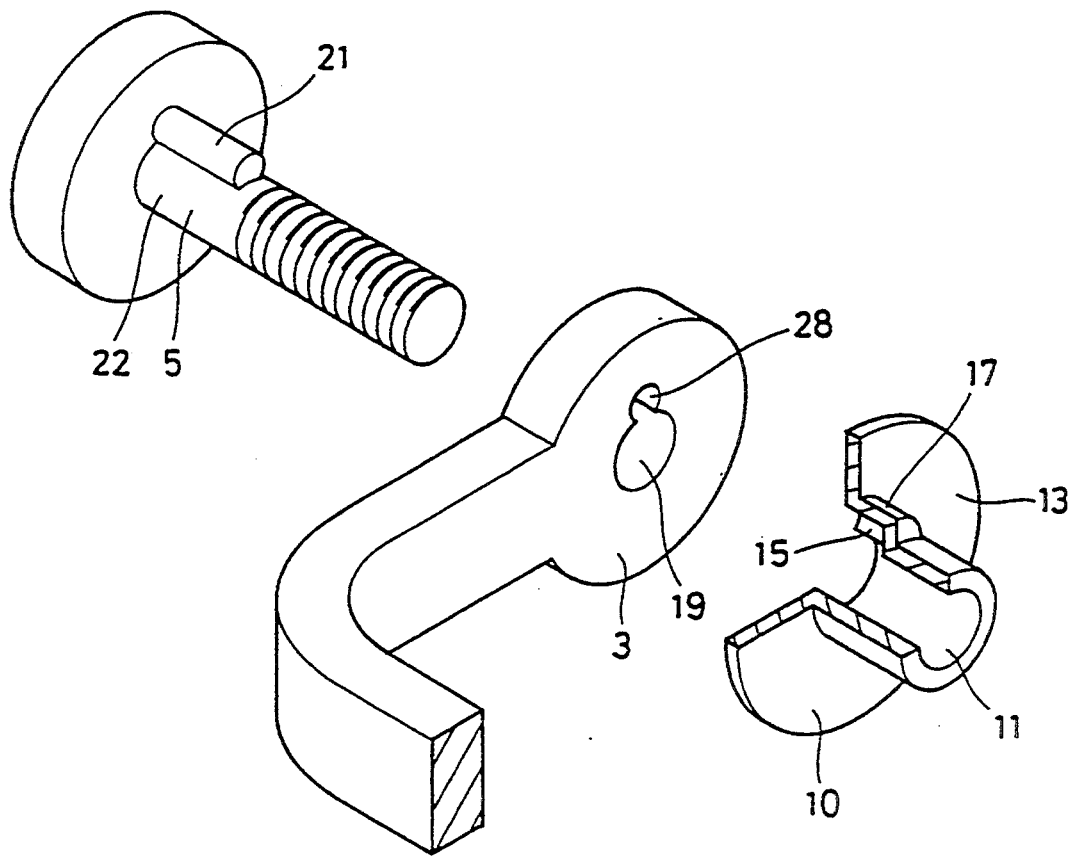
FIG. 28 is a perspective view of still another embodiment showing a flanged bush, a coupling portion and a fixing screw.
Figure 30:
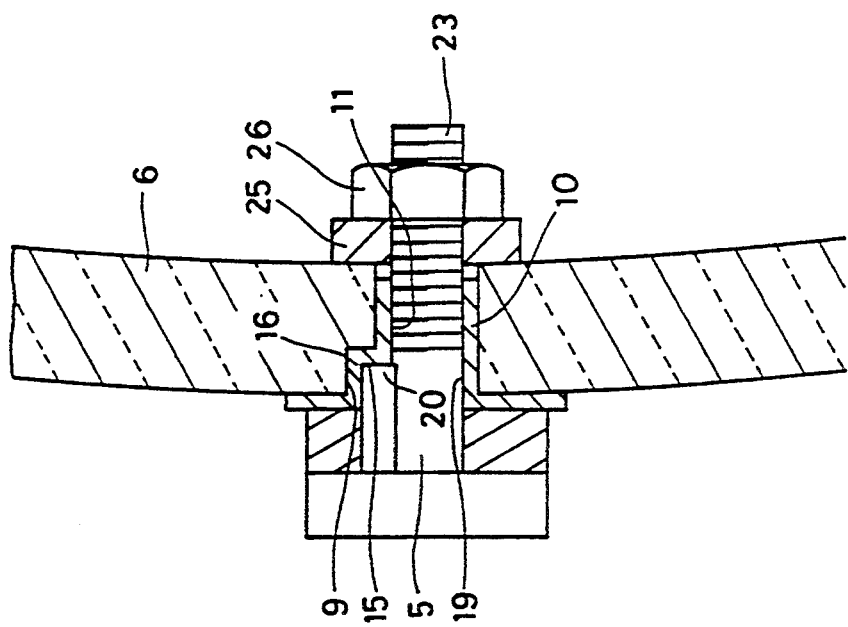
FIG. 30 is a sectional view of FIG. 28 showing the state when a coupling portion is coupled to a lens.
Figure 29:
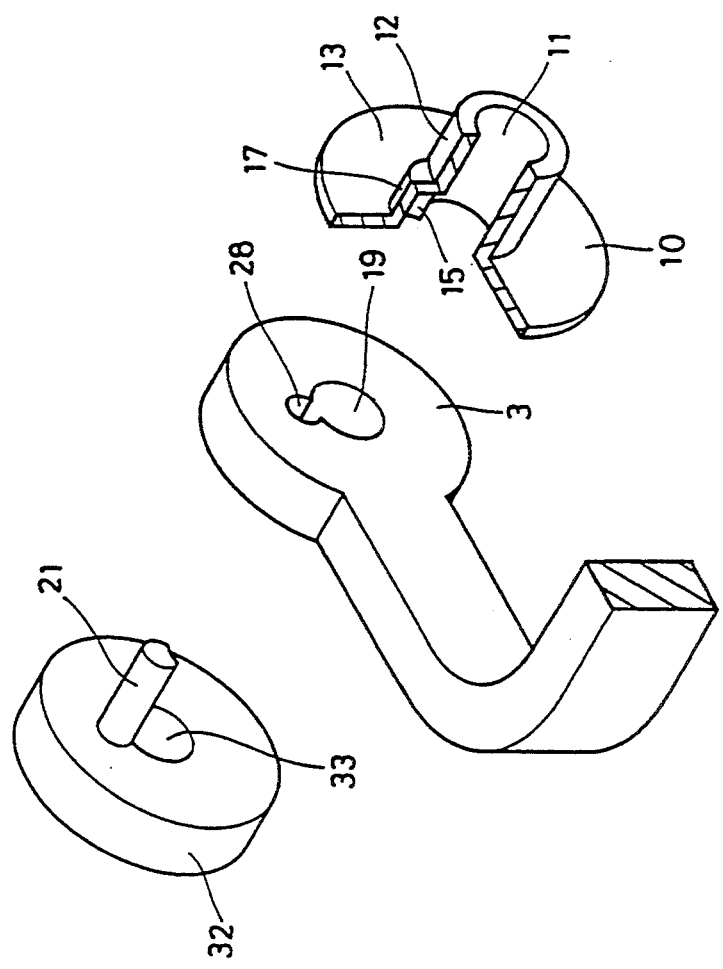
FIG. 29 is a perspective view of still another embodiment showing a flanged bush, a seating plate and a coupling portion.

FIGS. 28–30 show the coupling structure of the above embodiment in which the bore and the recess are arranged at one side of the lens so as to communicate with each other. By positioning the washer 25 and then screwing the nut 26 onto the rear side of the lens and tightening the nut, the end 20 of the protrusion 21 which has passed the bore 28 of the coupling portion 3 depresses the depressed portion 15 of the flange 13 and sinks therein. The projection 16 thus formed is pushed into the recess 9 so as not to disengage therefrom. As a result, the bore 28 of the coupling portion 3 is brought into engagement with the fixed protrusion 21 and the coupling portion 3 is integrally coupled to the lens 6 in a fixed manner.

(3) In any of above embodiments (including the one in which the bore and the recess communicate with each other at one side), the recess 9 may be in the form of a through hole. FIGS. 31 and 32 illustrate one embodiment thereof referring to the First Embodiment. The engaging portion 17 is cylindrically shaped so as to be accommodated in the recess 9. By placing the flange 13 of the flanged bush 10 over the recess 9, a cylindrical portion 34 is brought into engagement with the recess 9. By screwing the nut 26 onto the threaded shank 23 protruding from the rear side of the lens 6 and tightening it, the protrusion 21 formed on the coupling portion 3 is inserted in the cylindrical portion 34. Thus, the coupling portion 3 is coupled to the lens 6 in a fixed manner.

Figure 33:
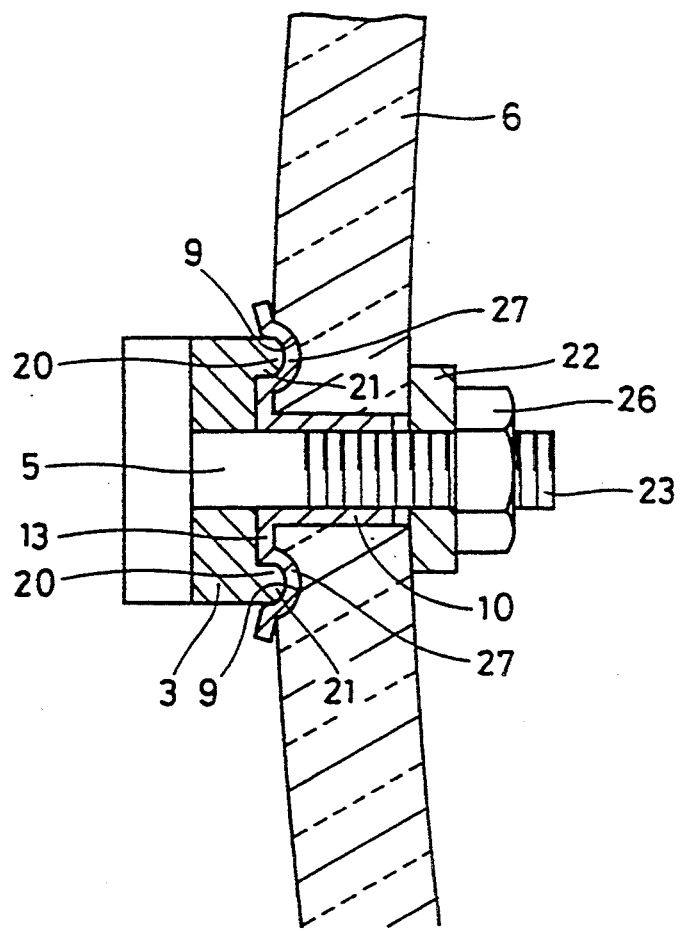
FIG. 33 is a sectional view of still another embodiment showing a state when a coupling portion is coupled to a lens.
Figure 34:
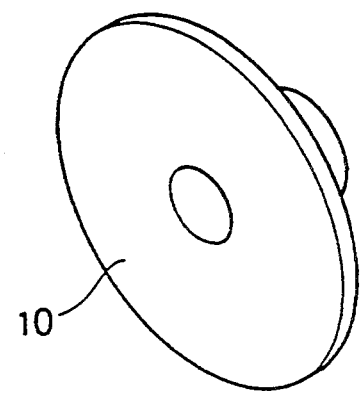
FIG. 34 is a perspective view of a flanged bush having no engaging portion.
Figure 35:
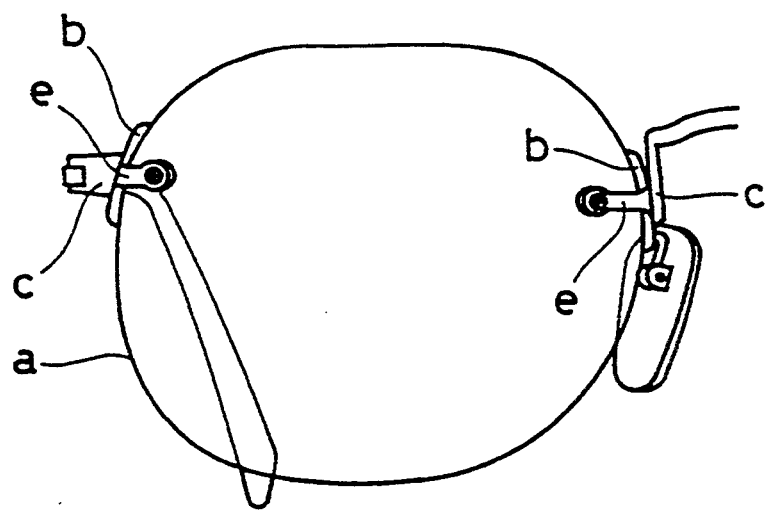
FIG. 35 is a front view showing a conventional coupling structure formed on a bridge and a temple.
Figure 36:
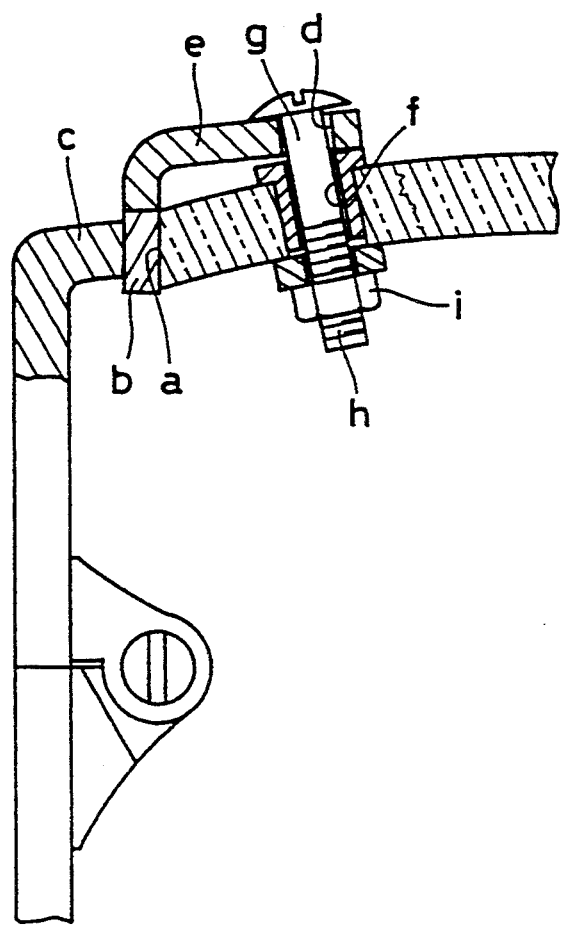
FIG. 36 is a sectional view showing the conventional coupling structure in which a temple is coupled to a lens.

(4) FIG. 33 illustrates a modified embodiment of First Embodiment in which the engaging portion 17 is not formed on the flange 13 of the flanged bush 10 (FIG. 34). The recess 9 is in the form of a semi-spherical concave and the end 20 of the protrusion 21 is in the form of a semi-spherical convex in accordance with the shape of the recess 9. The bottom face of the recess 9 may be flat, but it may preferably be rounded in order to smoothly deform and accommodate the flange 13. By screwing the nut 26 onto the threaded shank 23 protruding from the rear side of the lens 6 and tightening it, the ends 20 of the protrusions 21 depress the corresponding portions on the front surface of the flange 13 and sink therein. As a result, the depressed portions of the flange will deform and form projections 27 on its rear surface. They are pushed into the recesses 9 so as not to disengage therefrom. Thus, the coupling portion 3 is coupled to the lens 6 in a fixed manner.

What is claimed is:

1. A lens coupling structure, comprising:
   a lens having a front side and a rear side, a hole formed therein and a recess formed therein on said front side of said lens, said recess being located adjacent to said hole, and said recess being formed as one selected from the group consisting of a blind hole and a through hole;
   a flanged bush made of a resin, said flanged bush comprising a cylindrical portion, a flange formed around one end of said cylindrical portion and a screw hole at the center of said flanged bush;
   a coupling portion of one selected from the group consisting of a bridge and a temple, said coupling portion having a screw hole therein and a protrusion protruding toward said lens; and
   a fixing screw having a head, a threaded shank and a nut;
   wherein said cylindrical portion of said flanged bush is inserted in said hole of said lens, said threaded shank of said fixing screw is inserted from the front side of said lens into said screw hole of said coupling portion, said screw hole of said flanged bush and thus in said hole in said lens such that the end of said threaded shank protrudes from said rear side of said lens, and said nut is screwed onto the end of said threaded shank of said fixing screw such that said protrusion of said coupling portion engages said flange of said flanged bush on a first side thereof facing away from said lens and said flanged bush is in engagement with the front side of said lens.

2. The lens coupling structure of claim 1, wherein said protrusion of said coupling portion engages said flange of said flanged bush at a position corresponding to said recess of said lens such that said flanged bush engages said recess of said lens.

3. The lens coupling structure of claim 2, wherein said hole and said recess in said lens are spaced apart from each other.

4. The lens coupling structure of claim 3, wherein said flange of said flanged bush has a projection formed on a second side thereof facing toward said lens and a depressed portion on said first side thereof, wherein said protrusion engages said depressed portion and said projection engages said recess of said lens.

5. The lens coupling structure of claim 4, wherein said depressed portion of said flanged bush has an open bottom.

6. The lens coupling structure of claim 3, wherein said protrusion deforms said flange of said flanged bush on the first side thereof so as to form a corresponding projecting portion on a second side thereof that fits in said recess of said lens.

7. The lens coupling structure of claim 2, wherein said hole and said recess in said lens are open to and communicate with each other along sides of said hole and said recess in said lens.

8. The lens coupling structure of claim 7, wherein said flange of said flanged bush has a projection formed on a second side thereof facing toward said lens and a depressed portion on said first side thereof, wherein said protrusion engages said depressed portion and said projection engages said recess of said lens.

9. The lens coupling structure of claim 8, wherein said depressed portion of said flanged bush has an open bottom.

10. The lens coupling structure of claim 7, wherein said protrusion deforms said flange of said flanged bush on the first side thereof so as to form a corresponding projecting portion on a second side thereof that fits in said recess of said lens.

11. The lens coupling structure of claim 2, wherein said flange of said flanged bush has a projection formed on a second side thereof facing toward said lens and a depressed portion on said first side thereof, wherein said protrusion engages said depressed portion and said projection engages said recess of said lens.

12. The lens coupling structure of claim 11, wherein said depressed portion of said flanged bush has an open bottom.

13. The lens coupling structure of claim 12, wherein said protrusion deforms said flange of said flanged bush on the first side thereof so as to form a corresponding projecting portion on a second side thereof that fits in said recess of said lens.

14. A lens coupling structure, comprising:
    a lens having a front side and a rear side, a hole formed therein and a recess formed therein on said front side of said lens, said recess being located adjacent to said hole, and said recess being formed as one selected from the group consisting of a blind hole and a through hole;
    a flanged bush made of a resin, said flanged bush comprising a cylindrical portion, a flange formed around one end of said cylindrical portion and a screw hole at the center of said flanged bush;
    a coupling portion of one selected from the group consisting of a bridge and a temple, said coupling portion having a screw hole and one selected from the group consisting of a notch and a bore therein; and
    a fixing screw having a head, a threaded shank, a protrusion protruding toward said lens and a nut;
    wherein said cylindrical portion of said flanged bush is inserted in said hole of said lens, said threaded shank of said fixing screw is inserted from the front side of said lens into said screw hole of said coupling portion, said screw hole of said flanged bush and thus in said hole in said lens such that the end of said threaded shank protrudes from said rear side of said lens, said protrusion of said fixing screw is received in said one selected from the group consisting of a notch and a bore of said coupling portion and said nut is screwed onto the end of said threaded shank of said fixing screw such that said protrusion of said fixing screw engages said flange of said flanged bush on a side thereof facing away from said lens and said flanged bush is in engagement with the front side of said lens.

15. The lens coupling structure of claim 14, wherein said protrusion of said fixing screw engages said flange of said flanged bush at a position corresponding to said recess of said lens such that said flanged bush engages said recess of said lens.

16. The lens coupling structure of claim 15, wherein said hole and said recess in said lens are spaced apart from each other.

17. The lens coupling structure of claim 16, wherein said flange of said flanged bush has a projection formed on a second side thereof facing toward said lens and a depressed portion on said first side thereof, wherein said protrusion engages said depressed portion and said projection engages said recess of said lens.

18. The lens coupling structure of claim 17, wherein said depressed portion of said flanged bush has an open bottom.

19. The lens coupling structure of claim 16, wherein said protrusion deforms said flange of said flanged bush on the first side thereof so as to form a corresponding projecting portion on a second side thereof that fits in said recess of said lens.

20. The lens coupling structure of claim 15, wherein said hole and said recess in said lens are open to and communicate with each other along sides of said hole and said recess in said lens.

21. The lens coupling structure of claim 20, wherein said flange of said flanged bush has a projection formed on a second side thereof facing toward said lens and a depressed portion on said first side thereof, wherein said protrusion engages said depressed portion and said projection engages said recess of said lens.

22. The lens coupling structure of claim 21, wherein said depressed portion of said flanged bush has an open bottom.

23. The lens coupling structure of claim 20, wherein said protrusion deforms said flange of said flanged bush on the first side thereof so as to form a corresponding projecting portion on a second side thereof that fits in said recess of said lens.

24. The lens coupling structure of claim 15, wherein said flange of said flanged bush has a projection formed on a second side thereof facing toward said lens and a depressed portion on said first side thereof, wherein said protrusion engages said depressed portion and said projection engages said recess of said lens.

25. The lens coupling structure of claim 24, wherein said depressed portion of said flanged bush has an open bottom.

26. The lens coupling structure of claim 15, wherein said protrusion deforms said flange of said flanged bush on the first side thereof so as to form a corresponding projecting portion on a second side thereof that fits in said recess of said lens.

27. A lens coupling structure, comprising:
a lens having a hole formed therein and a recess formed therein, said recess being located adjacent to said hole, and said recess being formed as one selected from the group consisting of a blind hole and a through hole;
a flanged bush made of a resin, said flanged bush comprising a cylindrical portion, a flange formed around one end of said cylindrical portion and a screw hole at the center of said flanged bush;
a coupling portion of one selected from the group consisting of a bridge and a temple, said coupling portion having a screw hole and one selected from the group consisting of a notch and a bore therein;
a seating plate having a screw hole and a protrusion protruding toward said lens; and
a fixing screw having a head, a threaded shank, and a nut;
wherein said cylindrical portion of said flanged bush is inserted in said hole of said lens, said threaded shank of said fixing screw into said screw hole of said seating plate, said screw hole of said coupling portion, said screw hole of said flanged bush and said hole in said lens such that the end of said threaded shank protrudes from said rear side of said lens, said protrusion of said seating plate is received in said one selected from the group consisting of a notch and a bore of said coupling portion and said nut is screwed onto the end of said threaded shank of said fixing screw such that said protrusion of said seating plate engages said flange of said flanged bush and said flanged bush is in engagement with said lens.

28. The lens coupling structure of claim 27, wherein said protrusion of said fixing screw engages said flange of said flanged bush at a position corresponding to said recess of said lens such that said flanged bush engages said recess of said lens.

29. The lens coupling structure of claim 28, wherein said hole and said recess in said lens are spaced apart from each other.

30. The lens coupling structure of claim 29, wherein said flange of said flanged bush has a projection formed on a second side thereof facing toward said lens and a depressed portion on said first side thereof, wherein said protrusion engages said depressed portion and said projection engages said recess of said lens.

31. The lens coupling structure of claim 30, wherein said depressed portion of said flanged bush has an open bottom.

32. The lens coupling structure of claim 29, wherein said protrusion deforms said flange of said flanged bush on the first side thereof so as to form a corresponding projecting portion on a second side thereof that fits in said recess of said lens.

33. The lens coupling structure of claim 28, wherein said hole and said recess in said lens are open to and communicate with each other along sides of said hole and said recess in said lens.

34. The lens coupling structure of claim 33, wherein said flange of said flanged bush has a projection formed on a second side thereof facing toward said lens and a depressed portion on said first side thereof, wherein said protrusion engages said depressed portion and said projection engages said recess of said lens.

35. The lens coupling structure of claim 34, wherein said depressed portion of said flanged bush has an open bottom.

36. The lens coupling structure of claim 33, wherein said protrusion deforms said flange of said flanged bush on the first side thereof so as to form a corresponding projecting portion on a second side thereof that fits in said recess of said lens.

37. The lens coupling structure of claim 28, wherein said flange of said flanged bush has a projection formed on a second side thereof facing toward said lens and a depressed portion on said first side thereof, wherein said protrusion engages said depressed portion and said projection engages said recess of said lens.

38. The lens coupling structure of claim 37, wherein said depressed portion of said flanged bush has an open bottom.

39. The lens coupling structure of claim 28, wherein said protrusion deforms said flange of said flanged bush on the first side thereof so as to form a corresponding projecting portion on a second side thereof that fits in said recess of said lens.

* * * * *